(12) United States Patent
Suzuki

(10) Patent No.: US 7,961,396 B2
(45) Date of Patent: Jun. 14, 2011

(54) DIFFRACTIVE OPTICAL SYSTEM AND OPTICAL DEVICE

(75) Inventor: Kenzaburo Suzuki, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/796,633

(22) Filed: Jun. 8, 2010

(65) Prior Publication Data

US 2010/0246006 A1    Sep. 30, 2010

Related U.S. Application Data

(63) Continuation of application No. PCT/JP2008/072661, filed on Dec. 12, 2008.

(30) Foreign Application Priority Data

Dec. 14, 2007 (JP) ................................. 2007-323278

(51) Int. Cl.
*G02B 5/18* (2006.01)

(52) U.S. Cl. ........................................ 359/570; 359/569

(58) Field of Classification Search .................. 359/570, 359/569

See application file for complete search history.

(56) References Cited

U.S. PATENT DOCUMENTS

| 6,130,785 A | 10/2000 | Abe et al. |
| 6,414,798 B1 | 7/2002 | Koizumi |

FOREIGN PATENT DOCUMENTS

| JP | 2001-66522 A | 3/2001 |
| JP | 2004-126061 A | 4/2004 |
| JP | 2004-126393 A | 4/2004 |

*Primary Examiner* — Joshua L Pritchett
(74) *Attorney, Agent, or Firm* — Miles & Stockbridge P.C.

(57) ABSTRACT

A diffractive optical system including a diffractive optical element has a concave lens component having a first diffractive optical surface, and an optical member having a second diffractive optical surface, the concave lens component and the optical member being arranged so that the first diffractive optical surface and the second diffractive optical surface face each other, and the conditional expression $0.003 < t/f < 0.3$ being satisfied, where t is the thickness of the concave lens component on the optical axis, and f is the focal length of the diffractive optical system.

19 Claims, 16 Drawing Sheets

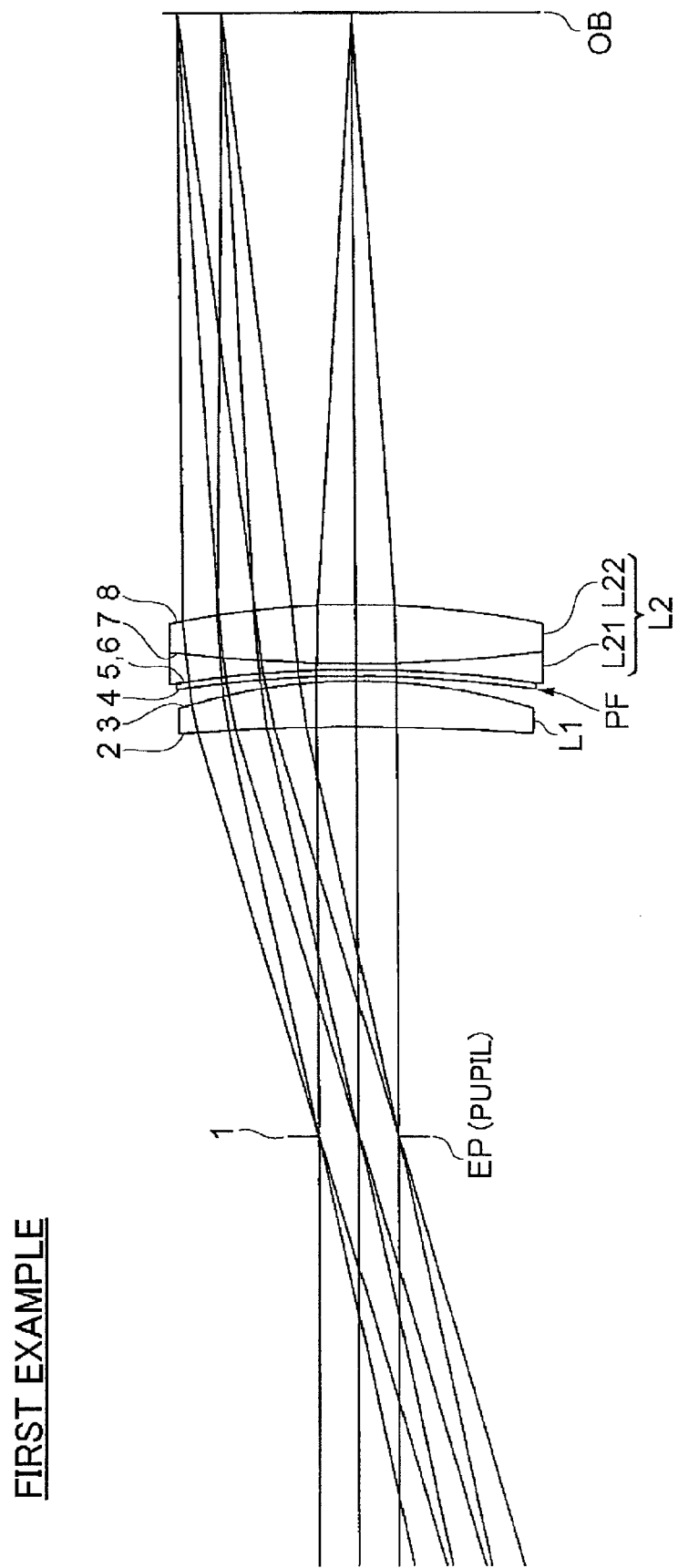

DIFFRACTIVE OPTICAL SYSTEM AND OPTICAL DEVICE

This is a continuation of PCT International Application No. PCT/JP2008/072661, filed on Dec. 12, 2008, which is hereby incorporated by reference. This application also claims the benefit of Japanese Patent Application No. 2007-323278, filed in Japan on Dec. 14, 2007, which is hereby incorporated by reference.

TECHNICAL FIELD

The present invention relates to an optical system in which diffraction is applied, and particularly relates to an optical system and optical device that are suitable for a viewing optical system, a projection optical system, or the like.

TECHNICAL BACKGROUND

Optical elements (usually made of glass) that utilize lens diffraction are commonly used to enhance optical performance, and particularly to reduce aberration and enhance picture quality (see Patent Document 1, for example). In an optical system, the degree of freedom in aberration correction must be increased in order to adequately reduce Seidel's five aberrations and chromatic aberration with respect to a reference spectral line, and the number of lenses in the optical system often unavoidably increases.

Patent Document 1: U.S. Pat. No. 6,130,785

DISCLOSURE OF THE INVENTION

Problems to be Solved by the Invention

Particularly in optical systems used in viewing devices worn on the head, or in optical systems used in electronic viewfinders and the like, the number of lenses constituting the optical system is conventionally increased in order to enhance optical performance, or a plurality of optical materials having different refractive indices or dispersions, or optical materials (glass) having high specific gravity are used in order to adequately correct the chromatic aberration of the optical system, and the accompanying increases in size and weight of the optical system create problems in terms of device structure.

With the foregoing aspects of the prior art in view, it is an object of the present invention to provide a small-sized, lightweight, thin-profile diffractive optical system and optical device having excellent optical performance that are suitable in a viewing optical system or a projection optical system.

Means to Solve the Problems

According to a first aspect of the present invention, there is provided a diffractive optical system including a diffractive optical element; the diffractive optical system characterized in that the diffractive optical element has a concave lens component having a first diffractive optical surface, and an optical member having a second diffractive optical surface; the concave lens component and the optical member are arranged so that the first diffractive optical surface and the second diffractive optical surface face each other; and the conditional expression $0.003 < t/f < 0.3$ is satisfied, where t is the thickness of the concave lens component on the optical axis, and f is the focal length of the diffractive optical system.

In the present specification, the expression "arranged so that the first diffractive optical surface and the second diffractive optical surface face each other" corresponds to a broad concept that includes a state in which "the first diffractive optical surface and the second diffractive optical surface are arranged so as to be in contact with each other," and a state in which "the first diffractive optical surface and the second diffractive optical surface are arranged so as to face each other across a gap.

According to a second aspect of the present invention, there is provided an optical device characterized in comprising the diffractive optical system according to the abovementioned aspect.

Advantageous Effects of the Invention

As described above, according to the present invention, there can be provided a small-sized, lightweight, thin-profile diffractive optical system and optical device having exceptional optical performance (particularly chromatic aberration correction) and being suitable for use in a viewing optical system or a projection optical system.

BRIEF DESCRIPTION OF THE DRAWINGS

FIG. 1 is a schematic sectional view showing a multi-layer diffractive optical element, wherein

FIG. 2 is a view showing the structure of the optical system according to a first example;

EXPLANATION OF NUMERALS AND CHARACTERS 11 first optical element piece
12 second optical element piece 11a, 11b diffractive optical surface
13 grating wall surface (step portion)
EP eye point
PF bonded multi-layer diffractive optical element
OB viewing object

DESCRIPTION OF THE PREFERRED EMBODIMENTS

Embodiments of the present invention will be described with reference to the drawings. Various attempts have been made in the past to incorporate a diffractive optical surface into the optical system of an optical disk pickup lens or the like, for example, in order to achieve performance enhancement and size reduction that could not be achieved in a dioptric system or a reflecting optical system. However, in a single-layer optical diffractive element having a diffractive optical surface of such description, flare is created by light of different wavelengths than the design wavelength, thereby compromising picture quality and image quality, and applications have been limited to use with laser light sources and other single-wavelength or narrow wavelength band light sources.

A so-called multi-layer (or laminate) diffractive optical element has therefore recently been proposed. This type of diffractive optical element has a diffractive optical surface (relief pattern) formed in a sawtooth shape, and is formed by laminating a plurality of optical element pieces having different refractive indices and dispersions in separated or bonded fashion, and high diffraction efficiency is maintained through substantially the entire range of the desired wide wavelength band (e.g., the visible light region). Specifically, a multi-layer diffractive optical element features satisfactory wavelength characteristics.

Figure 1A:
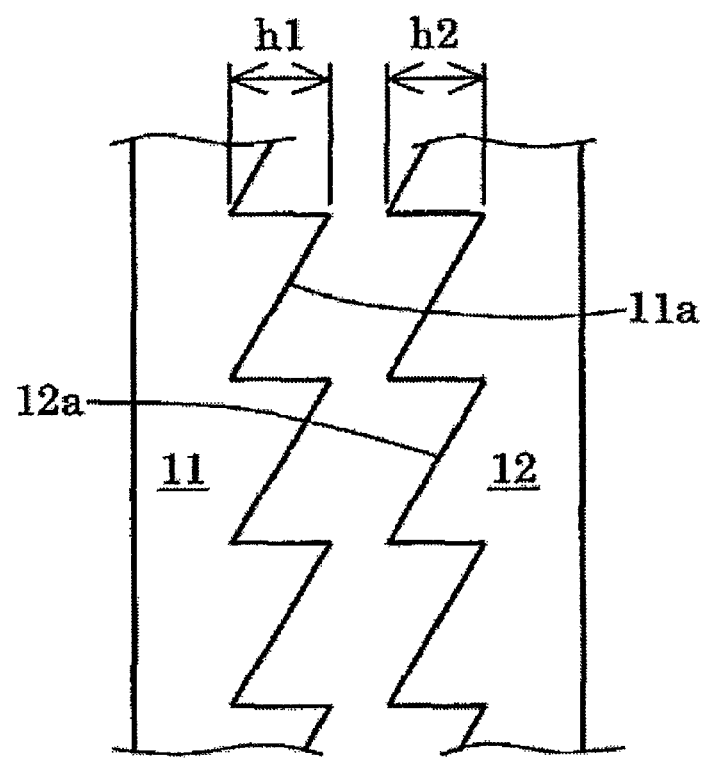
FIG. 1A is a schematic sectional view showing the separated multi-layer diffractive optical element.

A description shall now be provided of a structure of a multi-layer diffractive optical element. The optical element is composed of a first optical element piece 11 made of a first material, and a second optical element piece 12 made of a second material having a refractive index and dispersion that are different from those of the first material, and the opposing surfaces of the optical element pieces are formed in a sawtooth shape, as shown in FIG. 1A. The grating height (groove height) h1 of the first optical element piece 11 is set to a predetermined value, and the grating height h2 of the second optical element piece 12 is set to another predetermined value so as to satisfy an achromatism condition with respect to two specific wavelengths. Through this configuration, the diffraction efficiency with respect to the two specific wavelengths is 1.0, and considerably high diffraction efficiency can be obtained with respect to other wavelengths as well. The diffraction efficiency is defined as the ratio $\eta$ ($=I_1/I_0$) of the intensity $I_0$ of light incident on the diffractive optical element and the intensity $I_1$ of the first-order diffracted beam that is included in the light that passes through the diffractive optical element in a transmission diffractive optical element.

Figure 1B:
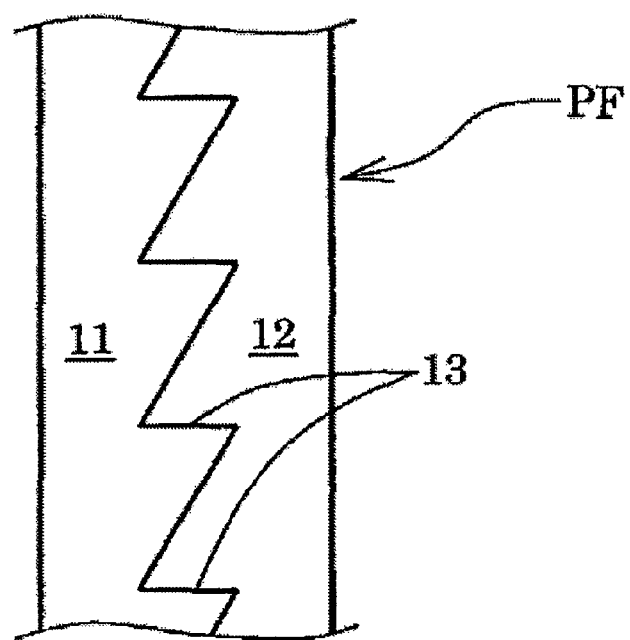
FIG. 1B is a schematic sectional view showing the bonded multi-layer diffractive optical element.

There has been proposed a bonded multi-layer diffractive optical element PF in which the grating height h1 of the diffractive optical surface 11a in the first optical element piece 11 coincides with the grating height h2 of the diffractive optical surface 12a in the second optical element piece 12, as shown in FIG. 1B. In this bonded multi-layer diffractive optical element PF, the second optical element piece 12 is bonded to and joined with the surface shape in which the diffractive optical surface is formed in the first optical element piece 11, and compared with a separated multi-layer diffractive optical element, the bonded multi-layer diffractive optical element PF has less error sensitivity (tolerance) in the grating height of the diffractive optical surface and less error sensitivity (tolerance) in the surface roughness of the grating surface, is easier to manufacture, has excellent productivity, offers a high potential for mass production, and reduces costs as an optical product. Any of the first optical element piece 11 and second optical element piece 12 is formed first with high precision, and the other optical element piece may then be molded by pouring in a UV-curable resin or the like. In this case, the grating formed first acts as a mold to enable the subsequently molded grating to be precisely formed, and no eccentricity whatsoever is formed in either of the gratings. So forming the diffractive optical element in multiple layers enables the diffractive optical element to be applied to substantially all wavelengths, and the diffractive optical element can readily be used in imaging lenses for photographic cameras that utilize white light having a wide wavelength range, eyepieces used in the visible range, and other lenses.

The present invention relates to a small-sized, lightweight, thin-profile optical system that utilizes a multi-layer diffractive optical element such as described above. In particular, predetermined optical materials are used to form the first optical element piece and second optical element piece that constitute the diffractive optical element, whereby a small-sized, lightweight, thin-profile optical system having excellent optical performance is obtained.

The diffractive optical system according to the present embodiment will now be described. The diffractive optical system according to the present embodiment comprises a concave lens component having a first diffractive optical surface, and an optical member having a second diffractive optical surface, wherein the concave lens component and the optical member are arranged so that the first diffractive optical surface and the second diffractive optical surface face each other. Specifically, a multi-layer diffractive optical element is formed by the concave lens component and the optical member. By incorporating a multi-layer diffractive optical element into the optical system, chromatic aberration is satisfactorily corrected throughout a wide wavelength range, and it is possible to realize a small-sized, lightweight, thin-profile optical system having excellent optical performance, in which adequately high diffraction efficiency is maintained. In other words, by utilizing the characteristics of a multi-layer diffractive optical element, refractive power is imparted to the grating formation surface on one side, the degree of freedom of aberration correction is increased, and the diffractive optical system of the present embodiment achieves excellent optical performance.

A diffractive optical system such as described above can be used as a viewing optical system such as an imaging lens optical system or an eyepiece optical system, or as a projection optical system in which a display element is placed near an object surface.

In the two optical element pieces that constitute the multi-layer diffractive optical element, one of the optical element pieces must be composed of a material having a relatively high refractive index and low dispersion, and the other optical element piece must be composed of a material having a relatively low refractive index and high dispersion, but either of the materials may be placed on the object side (the side on which light is incident). Selecting the combination of the material having a relatively high refractive index and low dispersion and the material having a relatively low refractive index and high dispersion is important particularly in a bonded multi-layer diffractive optical element. In a bonded multi-layer diffractive optical element, the difference in refractive index between the two diffractive optical members (the concave lens and the optical member in the present optical system) at the d-line is preferably 0.45 or less in order to reduce the error sensitivity to the desired degree for manufacturing. The difference in refractive index between the two diffractive optical members is more preferably 0.2 or less.

In the configuration described above, the following conditional expression (1) is preferably satisfied, where t is the thickness of the concave lens component on the optical axis, and f is the focal length of the diffractive optical system.

$$0.003 < t/f < 0.3 \quad (1)$$

The conditional expression (1) above specifies the appropriate thickness t of the concave lens component, which is a significant factor in reducing the thickness and weight of the diffractive optical system as a whole. When the upper limit of the conditional expression (1) is exceeded, the concave lens component is too thick, and not only are the size and weight reduction compromised, but more light is absorbed by the material (resin) that constitutes the concave lens component, and coloration of the visual field and other problems are prone to occur. When the lower limit of the conditional expression (1) is not satisfied, the concave lens component is too thin, the predetermined diffracted beam may not be obtained, and the concave lens component may be difficult to mold in the vicinity of the optical axis. The upper limit of the conditional expression (1) is preferably set to 0.2 in order to ensure the effects of the present embodiment. The lower limit of the conditional expression (1) is preferably set to 0.005 in order to ensure the effects of the present embodiment.

The following conditional expression (2) is also preferably satisfied, where ΔNd is the difference in refractive index between the concave lens component and the optical member at the d-line (wavelength: 587.6 nm).

$$0.005 < \Delta Nd < 0.45 \quad (2)$$

The conditional expression (2) above specifies the appropriate range for the refractive index difference ΔNd between the concave lens component and optical member that constitute the diffractive optical element. When the upper limit of the conditional expression (2) is exceeded, the refractive index difference ΔNd is too large, and there is too much sensitivity to manufacturing error in the grating of the diffractive optical surface. When the lower limit of the conditional expression (2) is not satisfied, the grating height required by the diffractive optical surface becomes too large and presents a disadvantage in manufacturing, the wall surfaces of the grating (step portions: indicated by the reference numeral 13 in FIG. 1B) form shadows that reduce blaze ray diffraction efficiency, and significant stray light is created by scattering or reflection of light that is incident on the grating wall surfaces, which causes reduced picture quality. The upper limit of the conditional expression (2) is preferably set to 0.2 in order to ensure the effects of the present embodiment. The lower limit of the conditional expression (2) is preferably set to 0.15 in order to ensure the effects of the present embodiment.

The following conditional expression (3) is also preferably satisfied, where fN (<0) is the focal length of the concave lens component, and f is the focal length of the diffractive optical system.

$$-8.5 < fN/f < -0.3 \quad (3)$$

The conditional expression (3) above specifies the appropriate ratio of the focal length fN of the concave lens component and the focal length f of the diffractive optical system. When this ratio exceeds the upper limit of the conditional expression (3), achromatism is inadequate. When the ratio is below the lower limit of the conditional expression (3), achromatism is excessive, the outside edges are too thick, and the concave lens component becomes difficult to mold. The upper limit of the conditional expression (3) is preferably set to −0.5 in order to ensure the effects of the present embodiment. The lower limit of the conditional expression (3) is preferably set to −5.0 in order to ensure the effects of the present embodiment.

The following conditional expression (4) is also preferably satisfied, where t is the thickness of the concave lens component on the optical axis, s is the total thickness of the diffractive optical system on the optical axis, and L is the distance from the pupil to the image surface.

$$0.00015 < (t \cdot s)/L^2 < 0.1 \quad (4)$$

The conditional expression (4) above specifies the appropriate thickness t of the concave lens component and the total thickness s of the diffractive optical system in terms of the distance L from the pupil to the image surface. When the upper limit of the conditional expression (4) is exceeded, at least one of the total thickness s of the diffractive optical system and the thickness t of the concave lens component is too large, which leads to increased size of the lens system, the concave lens component is too thick to mold easily, or light absorption increases. When the ratio above is less than the lower limit of the conditional expression (4), at least one of the total thickness s of the diffractive optical system and the thickness t of the concave lens component is too small, coma aberration tends to be inadequately corrected, or the concave lens component is too thin to be easily molded. The upper limit of the conditional expression (4) is preferably set to 0.005 in order to ensure the effects of the present embodiment. The lower limit of the conditional expression (4) is preferably set to 0.003 in order to ensure the effects of the present embodiment.

The following conditional expression (5) is also preferably satisfied, where Δ is the spread width in the optical axis direction of the d-line, g-line, C-line, and F-line spectra; and f is the focal length of the diffractive optical system.

$$0.001 < \Delta/f < 0.1 \quad (5)$$

The conditional expression (5) above specifies a condition for the appropriate correction range for longitudinal chromatic aberration. When the conditional expression (5) exceeds the upper limit, there is too much longitudinal chromatic aberration, the image becomes colored, and picture quality is significantly compromised. When the lower limit of the conditional expression (5), the pitch of the grating grooves is too small, and not only is the grating difficult to manufacture, but the narrow pitch of the grating causes significant flare, and picture quality is compromised. The upper limit of the conditional expression (5) is preferably set to 0.08 in order to ensure the effects of the present embodiment. The lower limit of the conditional expression (5) is preferably set to 0.002 in order to ensure the effects of the present embodiment.

The following conditional expression (6) is also preferably satisfied, where Ed is the diffraction efficiency at the d-line, Eg is the diffraction efficiency at the g-line, and EC is the diffraction efficiency at the C-line.

$$(Eg + EC)/(2 \times Ed) > 0.8 \quad (6)$$

The conditional expression (6) above specifies the appropriate range for balancing the diffraction efficiency for light in a wider range of wavelengths. When the lower limit of the conditional expression (6) is not satisfied, the diffraction efficiency is too low for at least one of the g-line, which is a relatively short wavelength, and the C-line, which is a relatively long wavelength, with respect to the d-line, which is the primary wavelength; and increased diffraction flare adversely affects picture quality. Specifically, light in wavelengths or angles of view other than the blaze wavelength or blaze angle is diffracted, significant flare occurs, and satisfactory picture quality cannot be obtained. The upper limit of the conditional expression (6) is preferably set to 0.95 in order to ensure the effects of the present embodiment. The lower limit of the conditional expression (6) is preferably set to 0.9 in order to ensure the effects of the present embodiment.

The following conditional expression (7) is also preferably satisfied, where t is the thickness of the concave lens component on the optical axis, dN is the thickness of the optical member on the optical axis, and s is the total thickness of the diffractive optical system on the optical axis.

$$0.03 < (t+dN)/s < 0.5 \qquad (7)$$

The conditional expression (7) above specifies the appropriate range of the thickness of the diffractive lens portion (obtained by adding the thickness dN of the optical member on the optical axis to the thickness t of the concave lens component on the optical axis). The upper limit of the conditional expression (7) is preferably not exceeded because the diffractive lens portion becomes too thick and difficult to mold, more light is absorbed by the resin, leading to increased flare, and satisfactory picture quality cannot be obtained. When the lower limit of the conditional expression (7) is not satisfied, the diffractive lens portion is too thin, and the predetermined diffracted beam is no longer obtained. The upper limit of the conditional expression (7) is preferably set to 0.3 in order to ensure the effects of the present embodiment. The lower limit of the conditional expression (7) is preferably set to 0.05 in order to ensure the effects of the present embodiment.

The following conditional expression (8) is also preferably satisfied, where h is the grating height of the first diffractive optical surface, and d is the lesser of the thickness of the concave lens component on the optical axis and the thickness of the optical member on the optical axis.

$$10 < h/d < 500 \qquad (8)$$

The conditional expression (8) above specifies the appropriate relationship between the grating height h for forming a thin grating, and the thickness d of the lesser of the thickness of the concave lens component on the optical axis and the thickness of the optical member on the optical axis. Satisfying this conditional expression (8) enables satisfactory picture quality to be obtained. When the upper limit of the conditional expression (8) is exceeded, the grating height h is too large relative to the thickness d, and not only is the grating difficult to form, but the step portions of the grating increase in size, and stray light is prone to occur due to scattering and other effects on the light that reaches the step portions. When the lower limit of the conditional expression (8) is not satisfied, the optical material forming the grating is too thick, and not only is the grating also difficult to form, but the internal absorption of the material increases, the transmittance of the whole optical system declines, and coloration is prone to occur. The upper limit of the conditional expression (8) is preferably set to 300 in order to ensure the effects of the present embodiment. The lower limit of the conditional expression (8) is preferably set to 20 in order to ensure the effects of the present embodiment.

The conditional expression described below is also preferably satisfied in order to achieve more exceptional optical performance and a higher specification in the diffractive optical system of the present embodiment.

The following conditional expression (9) is preferably satisfied, where $\Delta Nd$ is the difference in refractive index between the concave lens component and the optical member at the d-line, and $\Delta vd$ is the difference in Abbe constant between the concave lens component and the optical member based on the d-line.

$$50 < \Delta vd/\Delta Nd < 2000 \qquad (9)$$

The conditional expression (9) above specifies the appropriate relationship between the optical members constituting the bonded multi-layer diffractive optical element, the optical members being composed of a high-refractive-index low-dispersion material and a low-refractive-index high-dispersion material, in order to obtain high diffraction efficiency throughout a predetermined wavelength range. When the upper limit of the conditional expression (9) is exceeded, high diffraction efficiency is not obtained throughout a wide wavelength range, light in wavelengths or angles of view other than the blaze wavelength or blaze angle is diffracted, significant flare occurs, and satisfactory picture quality cannot be obtained. Similarly, high diffraction efficiency throughout a wide wavelength range is not obtained when the lower limit of the conditional expression (9) is not satisfied. The upper limit of the conditional expression (9) is preferably set to 700 in order to ensure the effects of the present embodiment. The lower limit of the conditional expression (9) is preferably set to 100 in order to ensure the effects of the present embodiment.

The following conditional expression (10) is also preferably satisfied, where Ed is the diffraction efficiency at the d-line, Eg is the diffraction efficiency at the g-line, EC is the diffraction efficiency at the C-line, f is the focal length of the diffractive optical system, and $\Delta$ is the spread width in the optical axis direction of the d-line, g-line, C-line, and F-line spectra.

$$(Ed+Eg+EC)\cdot f/\Delta > 200 \qquad (10)$$

The conditional expression (10) above specifies the appropriate correction range for longitudinal chromatic aberration, and a condition for increasing the wavelength range of diffraction efficiency. The higher the numerical value of this conditional expression (10) is, the higher the diffraction efficiency is with respect to wavelengths throughout a wide wavelength range, and the smaller the longitudinal chromatic aberration is. When the lower limit of the conditional expression (10) is not satisfied, it is difficult to obtain the desired diffraction efficiency and correction of chromatic aberration. The lower limit of the conditional expression (10) is preferably set to 400 in order to ensure the effects of the present embodiment.

The requirements described below are preferably satisfied when the diffractive optical system of the present embodiment is actually formed.

The lens structure of the diffractive optical system in the present embodiment includes, in order from the viewing side or screen side, a first convex lens component, and a cemented lens composed of a second convex lens component and the concave lens component (in which the first diffractive optical surface is formed). One of the concave lens and the optical member is formed using a material having a relatively high refractive index and low dispersion, and the other of the concave and the optical member is formed using a material having a relatively low refractive index and high dispersion. The base lens (concave lens in the present embodiment) of the diffractive optical system may be made of glass or a plastic material, but glass, of which there are numerous types of differing refractive indices and dispersions, is advantageous for increasing image quality, whereas plastics have low specific gravity (relative to glass) and are advantageous for reducing the weight of the lens system.

Preferably, the first diffractive optical surface is disposed on a concave surface facing the pupil, and step portions of the grating of the first diffractive optical surface are formed at an angle with respect to the optical axis. This configuration enables flare due to scattering or reflection of obliquely incident light beams to be reduced, and satisfactory picture quality to be obtained. The surfaces of the step portions of the diffractive optical surface (see reference numeral 13 of FIG. 1B) are also preferably formed in a fine step pattern or blackened (subjected to a so-called darkening treatment) so as to suppress stray light or flare.

In the optical members (concave lens component and optical member in the present optical system) for forming the diffractive optical surface (grating), the viscosity of the material constituting any one of the optical element pieces (viscosity of the uncured material) is preferably 5 mPa·s or higher and 50,000 mPa·s or lower in order to maintain satisfactory molding properties and ensure excellent mass production properties. When this viscosity is 5 mPa·s or lower, the resin tends to flow during molding, a precise shape is difficult to form, and workability may be reduced. When the viscosity is 50,000 mPa·s or higher, the resin does not easily flow, workability is reduced, and entrainment of air bubbles is prone to occur.

The optical members for forming the diffractive optical surface (grating) are all preferably formed using a UV-curable resin in order to enhance production efficiency. The number of manufacturing steps can thereby be reduced, which leads to lower cost.

As described above, when the optical members for forming the diffractive optical surface (grating) are all made of a plastic material, the specific gravity of the resin is preferably 2.0 or lower in order to reduce size and weight. Plastics have a lower specific gravity than glass, and are therefore extremely effective at reducing the weight of the optical system. Even further enhanced effects are achieved when the specific gravity is 1.6 or lower.

A dye may also be mixed with any of the plastic materials of the optical members for forming the diffractive optical surface (grating) to create a color filter effect. For example, an infrared cut filter or the like may be formed as a measure for blocking stray light to a CCD in a small-sized imaging optical system.

A diaphragm may also be optionally provided in the optical path of the optical system, but the optical system is preferably configured so as to cut unwanted light rays and only allow passage of light rays useful to imaging. For example, the lens frame may act as an aperture diaphragm, and a diaphragm may be formed using a mechanical member in a position distanced from the lens. The shape of the diaphragm is dependent on the design specifications, is not limited to being circular, and may be elliptical or rectangular.

When the diffractive optical system of the present embodiment is used in a viewing optical system, it is preferably used in a viewing optical system having a loupe magnification of 2 or higher and 20 or lower. An optical system composed of a plurality of constituent elements obtained by incorporating this diffractive optical system is also not outside the scope of the present invention. The same applies for diffractive optical systems obtained by incorporating a refractive index profile lens, a crystal material lens, or the like.

EXAMPLES

Examples will be described hereinafter with reference to the drawings. Tables 1 through 3 are shown below, each of which showing data for each of first through third examples.

In all of the tables, surface numbers indicate the order of lens surfaces from the eye point EP (or pupil) side, r represents the radius of curvature of each lens surface, d represents the distance to the next lens surface, which is the distance from each optical surface to the next optical surface (or image surface), nd represents the refractive index with respect to the d-line (wavelength: 587.56 nm), ng represents the refractive index with respect to the g-line (wavelength: 435.8 nm), nC represents the refractive index with respect to the C-line (wavelength: 656.3 nm), and nF represents the refractive index with respect to the F-line (wavelength: 486.1 nm). The curvature radius r is such that the curvature of the convex surface facing the eye point is positive, and the radius of curvature of the concave surface facing the eye point is r. A curvature radius r of "0.00000" indicates a flat surface. The tables also show values that correspond to the conditional expressions (1) through (10) described above (conditional expression values).

In the tables, the radius of curvature, distance to the next lens surface, and other lengths are generally expressed in millimeter units. However, since equal optical performance is obtained whether in proportional magnification or proportional reduction in the optical system, the units are not limited to millimeters; other appropriate units may be used.

Aspheric surfaces for which an asterisk symbol is added to the right of the surface number in the tables are indicated by the equation (a) below, where y is the height in the direction perpendicular to the optical axis, S(y) is the distance (sag) along the optical axis from the tangential plane at the vertex of the aspheric surface to a position on the aspheric surface at height y, r is the radius of curvature (paraxial radius of curvature) of a reference sphere, κ is the conical coefficient, and Cn is the nth-order aspherical coefficient. The expression En indicates multiplication by $10^n$. For example, 1.234E-05=$1.234 \times 10^{-5}$.

$$S(y)=(y^2/r)/\{1+(1-\kappa \cdot y^2/r^2)^{1/2}\}+C2 \times y^2+C4 \times y^4+C6 \times y^6+C8 \times y^8+C10 \times y^{10} \quad \text{(a)}$$

In the lens data shown in the tables, the diffractive optical surface is expressed in accordance with a super-high refractive index method using the equation (a) described above. In the super-high refractive index method, the diffractive optical surface of the bonded multi-layer diffractive optical element is regarded to be a "thin lens," and the optical characteristics of the diffractive optical surface are expressed by an aspheric surface equation and an optical member having an extremely high refractive index. Equation (a) is thus used in each example for both the aspheric lens surface and the diffractive optical surface, but the equation (a) used for the aspheric lens surface expresses the aspheric shape of the lens surface, and the equation (a) used for the diffractive optical surface expresses the performance data of the diffractive optical surface. In the present examples, the d-line (wavelength: 587.6 nm; refractive index: 10001), C-line (wavelength: 656.3 nm; refractive index: 11170.4255), F-line (wavelength: 486.1 nm; refractive index: 8274.7311), and g-line (wavelength: 435.8 nm; refractive index: 7418.6853) are selected for use in computing the Aberration characteristics.

First Example

A first example will be described with reference to FIGS. 2 through 4 and Table 1. The eyepiece optical system of the first example as shown in FIG. 2 comprises, in order from the eye point EP (facing a viewing eye), a positive meniscus lens L1 (first convex lens component), the object-facing lens surface of which has an aspheric shape and the concave surface of which faces the eye point; and a cemented lens L2 having a biconvex lens L22 (second convex lens component) and a biconcave lens L21 (concave lens component) in which an optical member is provided via a diffractive optical surface to the lens surface facing an eye point EP in the optical path between the eye point EP and a viewing object OB such as with an intermediate image formed via an objective system, for example. Specifically, in the first example, a bonded multi-layer diffractive optical element PF is formed by the biconcave lens L21 and the optical member that is adjacent to the biconcave lens L21. The total angle of field of this eyepiece optical system is 32.4 degrees.

Table 1 shows data for the first example. The surface numbers 1 through 8 in Table 1 correspond to the surface numbers 1 through 8 in FIG. 2. In table 1, the lens surface corresponding to surface number 3 is an aspheric surface, and the refractive index data and aspheric surface data of surface number 5 express the optical characteristics of the diffractive optical surface of the bonded multi-layer diffractive optical element PF.

As is apparent from the data shown in Table 1, all of the conditional expressions (1) through (10) are satisfied by the diffractive optical system of the present example.

Figure 3:
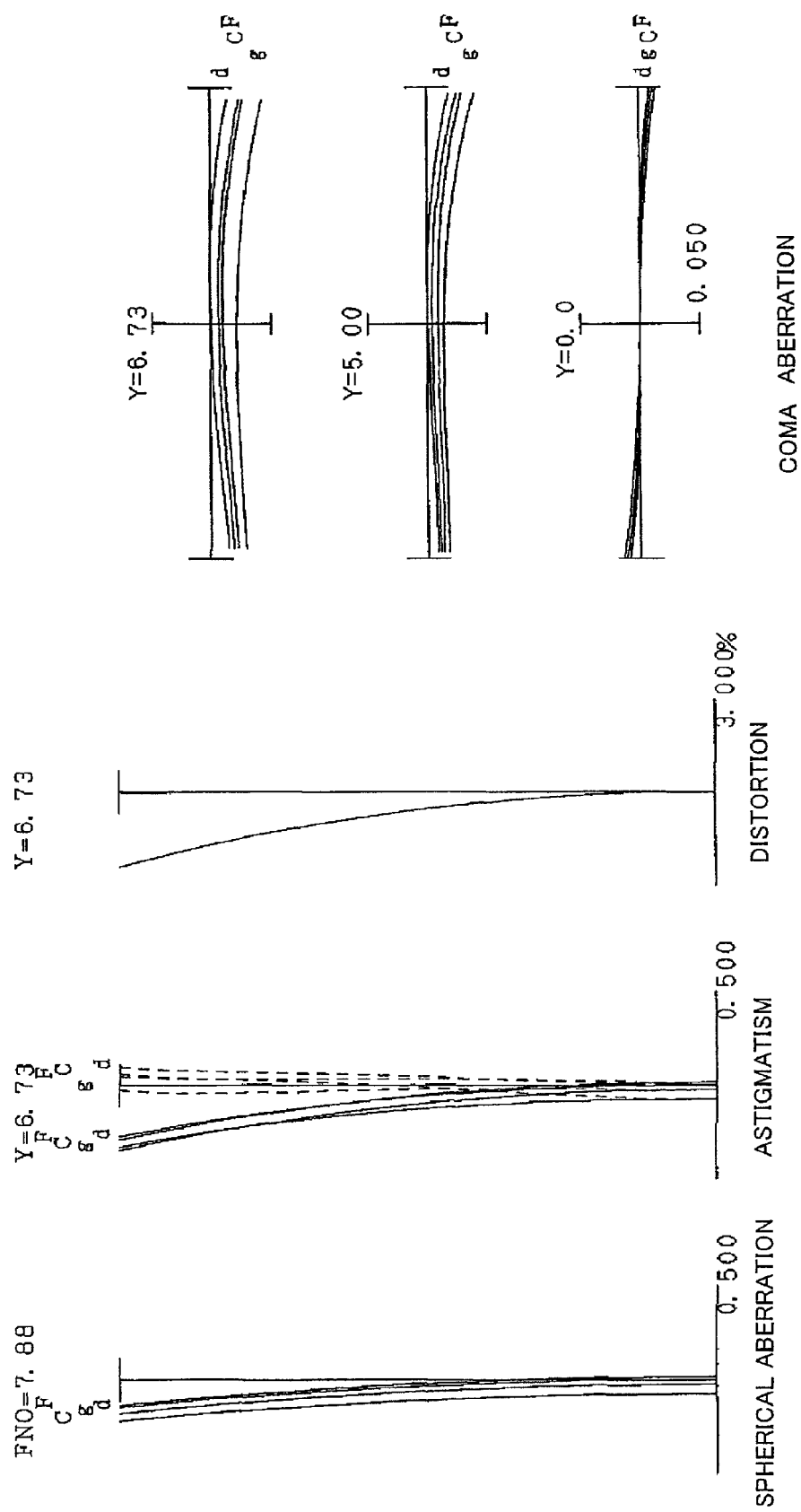
FIG. 3 is aberration diagrams according to the first example.

FIG. 3 is a view showing the spherical aberration, astigmatism, distortion, and coma aberration of the first example. The aberration indicates the results of ray tracing from the eye point EP side. In each aberration diagram, FNO represents the F number, Y represents the object height (height of the intermediate image) in the viewing object OB, d represents the d-line (wavelength: 587.6 nm), g represents the g-line (wavelength: 435.6 nm), F represents the F-line (wavelength: 486.1 nm), and C represents the C-line (wavelength: 656.3 nm). The value of NA with respect to the maximum aperture is shown in the spherical aberration diagram, the maximum value of the image height is shown in the astigmatism diagram and the distortion diagram, and the values for each image height are shown in the coma aberration diagram. The solid lines in the

TABLE 1

[Lens data]

| Surface Number | r | d | nd | ng | nC | nF |
|---|---|---|---|---|---|---|
| 1 | 0.00000 | 16.00000 | 1.000000 | | | |
| 2 | −88.00000 | 1.80000 | 1.743200 | 1.762050 | 1.738650 | 1.753720 |
| 3* | −22.16732 | 0.20000 | 1.000000 | | | |
| 4 | −45.00000 | 0.25000 | 1.556900 | 1.570900 | 1.553600 | 1.564700 |
| 5* | −45.00000 | 0.00000 | A | B | C | D |
| 6 | −45.00000 | 0.25000 | 1.518900 | 1.538000 | 1.514400 | 1.528900 |
| 7 | 60.00000 | 2.30000 | 1.772500 | 1.791970 | 1.767800 | 1.783370 |
| 8 | −35.00000 | 23.03423 | 1.000000 | | | |

A = 0.10010000E−05,
B = 0.741868530E−04,
C = 0.111704255E−05,
D = 0.827473110E−04

[Aspheric surface data]

Third surface:

$\kappa = 1.0000$  C2 = 0.00000E−00   C4 = 1.06740E−06,
          C6 = 1.11480E−08   C8 = 6.50470E−10   C10 = 0.00000E−00

Fifth surface:

$\kappa = 1.0000$  C2 = 1.35920E−07   C4 = −3.63580E−10
          C6 = 4.33930E−12   C8 = −1.24290E−14   C10 = 0.00000E−00

[Conditional expression values]

t = 0.25
f = 23.699
ΔNd = 0.038
fN = −49.515
s = 4.8
L = 43.834
Δ = 0.0904
Eg = 0.944
EC = 0.965
Ed = 1.000
dN = 0.25
h = 15.000
d = 0.25
Δvd = 14.38
ΔNd = 0.038
Eg + Ed + EC = 2.909
 (1) t/f = 0.01055
 (2) ΔNd = 0.038
 (3) fN/f = −2.089
 (4) (t · s)/L$^2$ = 0.00062
 (5) Δ/f = 0.00381
 (6) (Eg + EC)/(2 × Ed) = 0.955
 (7) (t + dN)/s = 0.1042
 (8) h/d = 60.00
 (9) Δvd/ΔNd = 378.42
 (10) (Eg + Ed + EC) · f/Δ = 762.62 astigmatism diagram indicate sagittal image surfaces, and the dashed lines indicate meridional image surfaces. The above description of the aberration diagrams applies to the aberration diagrams of the other examples as well, and thus is not repeated. As is apparent from the aberration diagrams, aberration is satisfactorily corrected in the first example, and excellent image quality is maintained.

Figure 4:
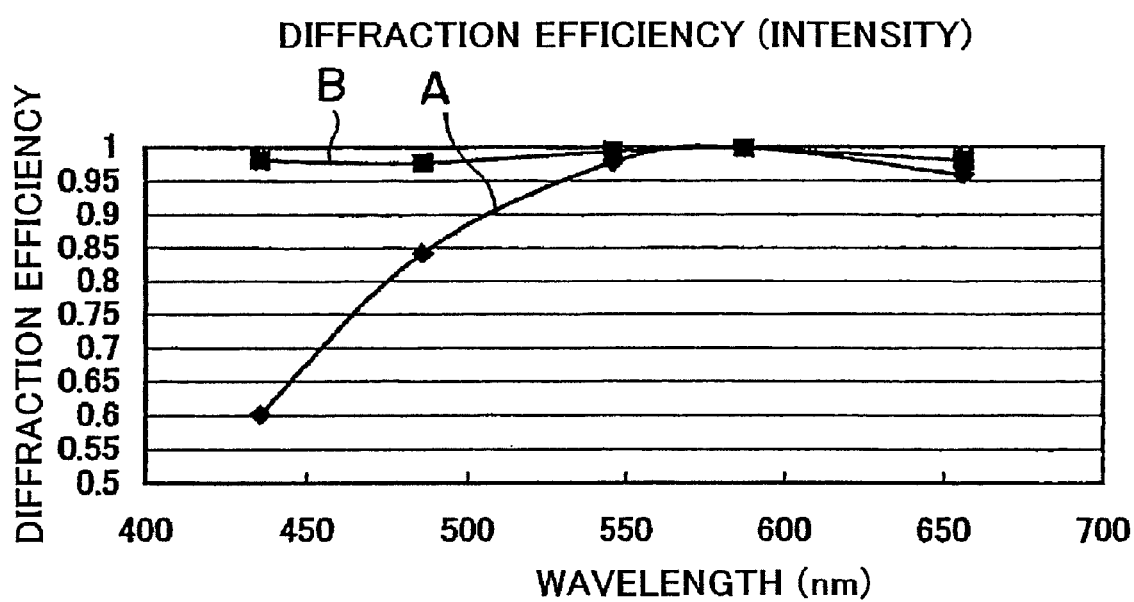
FIG. 4 is a view showing the diffraction efficiency for each wavelength of the bonded multi-layer diffractive optical element.

Curves A and B in FIG. 4 are distributions of the diffraction efficiency when the diffraction efficiency at the d-line is set so as to be 100%, wherein Curve A shows the diffraction efficiency in a single-layer diffractive optical element in which diffraction grating grooves are formed in the surface of the biconcave lens L21, and Curve B shows the diffraction efficiency in a multi-layer diffractive optical element PF composed of the biconcave lens L21 and an optical member that is adjacent to the biconcave lens L21 via a diffractive optical surface. In the present example, it is apparent that a high diffraction efficiency (light intensity) of 0.95 (95%) or higher in the wavelength region from the g-line to the C-line is obtained by endowing the diffractive optical element PF with a multi-layer structure.

Second Example

Figure 5:
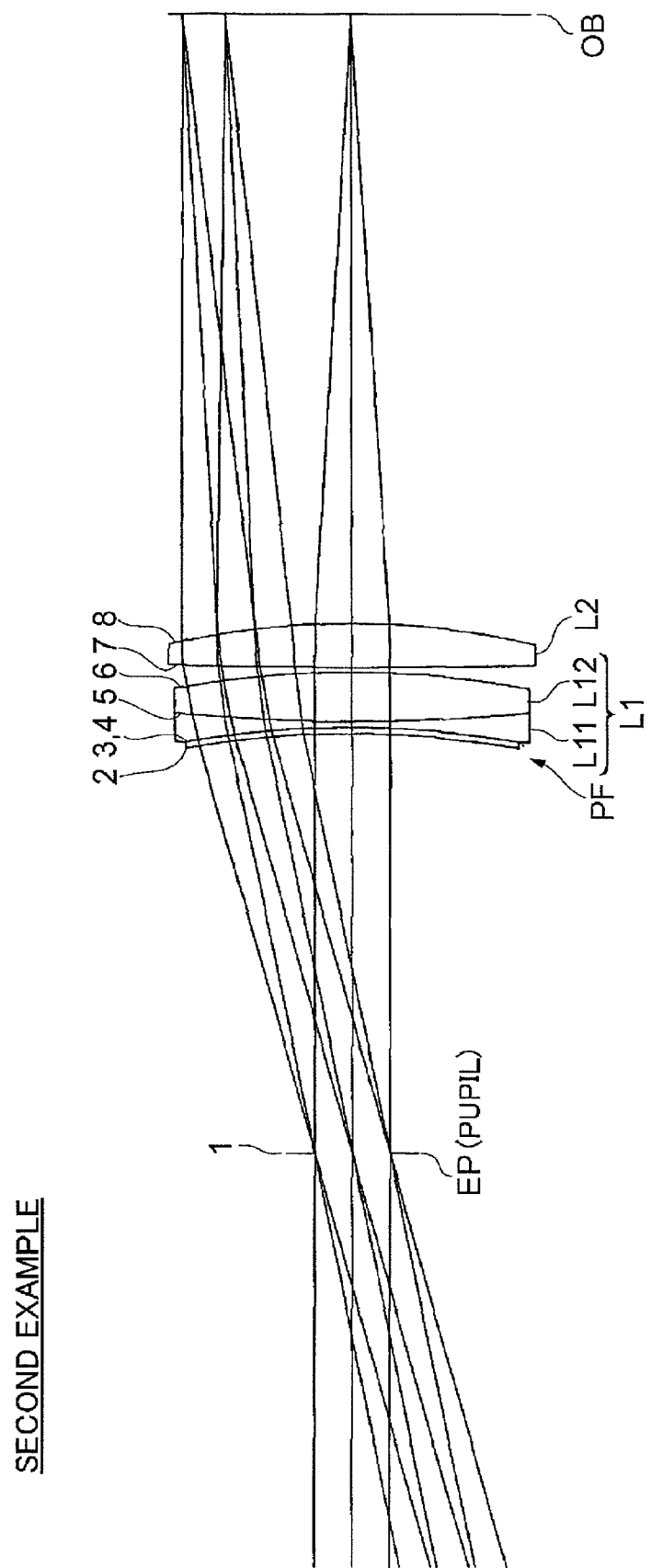
FIG. 5 is a view showing the structure of the optical system according to a second example.

A second example will be described with reference to FIGS. 5 and 6, and Table 2. The eyepiece optical system of the second example as shown in FIG. 5 comprises, in order from the eye point EP (facing a viewing eye), a cemented lens L1 having a biconvex lens L12 (second convex lens component) and a biconcave lens L11 (concave lens component) in which an optical member is provided via a diffractive optical surface to the lens surface facing the eye point EP; and a biconvex lens L2 (first convex lens component), the object-facing lens surface of which has an aspheric shape. Specifically, in the second example, a bonded multi-layer diffractive optical element PF is formed by the biconcave lens L11 and the optical member that is adjacent to the biconcave lens L11. The total angle of field of this eyepiece optical system is 31.1 degrees.

Table 2 shows data for the second example. The surface numbers 1 through 8 in Table 2 correspond to the surface numbers 1 through 8 in FIG. 5. In Table 2, the lens surface corresponding to surface number 7 is an aspheric surface, and the refractive index data and aspheric surface data of surface number 3 express the optical characteristics of the diffractive optical surface of the bonded multi-layer diffractive optical element PF.

TABLE 2

| [Lens data] | | | | | | |
|---|---|---|---|---|---|---|
| Surface Number | r | d | nd | ng | nC | nF |
| 1 | 0.00000 | 17.00000 | 1.000000 | | | |
| 2 | −38.00000 | 0.25000 | 1.556900 | 1.570900 | 1.553600 | 1.564700 |
| 3* | −38.00000 | 0.00000 | A | B | C | D |
| 4 | −38.00000 | 0.25000 | 1.518900 | 1.538000 | 1.514400 | 1.528900 |
| 5 | −70.00000 | 2.00000 | 1.834810 | 1.859530 | 1.828970 | 1.848510 |
| 6 | −38.00000 | 0.20000 | 1.000000 | | | |
| 7* | 300.00000 | 1.80000 | 1.694000 | 1.709300 | 1.690240 | 1.702570 |
| 8 | −31.37864 | 24.59430 | 1.000000 | | | |

$A = 0.10010000E−05$,
$B = 0.741868530E−04$,
$C = 0.111704255E−05$,
$D = 0.827473110E−04$

[Aspheric surface data]

Third surface:

$\kappa = 1.0000$   $C2 = 1.45000E−07$   $C4 = −3.63580E−10$
          $C6 = 4.33930E−12$   $C8 = −1.24290E−14$   $C10 = 0.00000E−00$ Seventh surface:

$\kappa = 1.0000$   $C2 = 0.00000E−00$   $C4 = −1.11480E−08$
          $C6 = −1.11480E−08$   $C8 = −3.00000E−10$   $C10 = 0.00000E−00$

[Conditional expression values]

$t = 0.25$
$f = 24.887$
$\Delta Nd = 0.038$
$fN = −47.428$
$s = 4.5$
$L = 46.094$
$\Delta = 0.1268$
$Eg = 0.944$
$EC = 0.965$
$Ed = 1.000$
$dN = 0.25$
$h = 15.000$
$d = 0.25$
$\Delta vd = 14.38$
$\Delta Nd = 0.038$
$Eg + Ed + EC = 2.909$
 (1) $t/f = 0.01005$
 (2) $\Delta Nd = 0.038$
 (3) $fN/f = −1.906$
 (4) $(t \cdot s)/L^2 = 0.00053$ TABLE 2-continued (5) $\Delta/f = 0.00510$
(6) $(Eg + EC)/(2 \times Ed) = 0.955$
(7) $(t + dN)/s = 0.1111$
(8) $h/d = 60.00$
(9) $\Delta vd/\Delta Nd = 378.42$
(10) $(Eg + Ed + EC) \cdot f/\Delta = 570.94$ As is apparent from the data shown in Table 2, all of the conditional expressions (1) through (10) are satisfied by the diffractive optical system of the present example.

Figure 6:
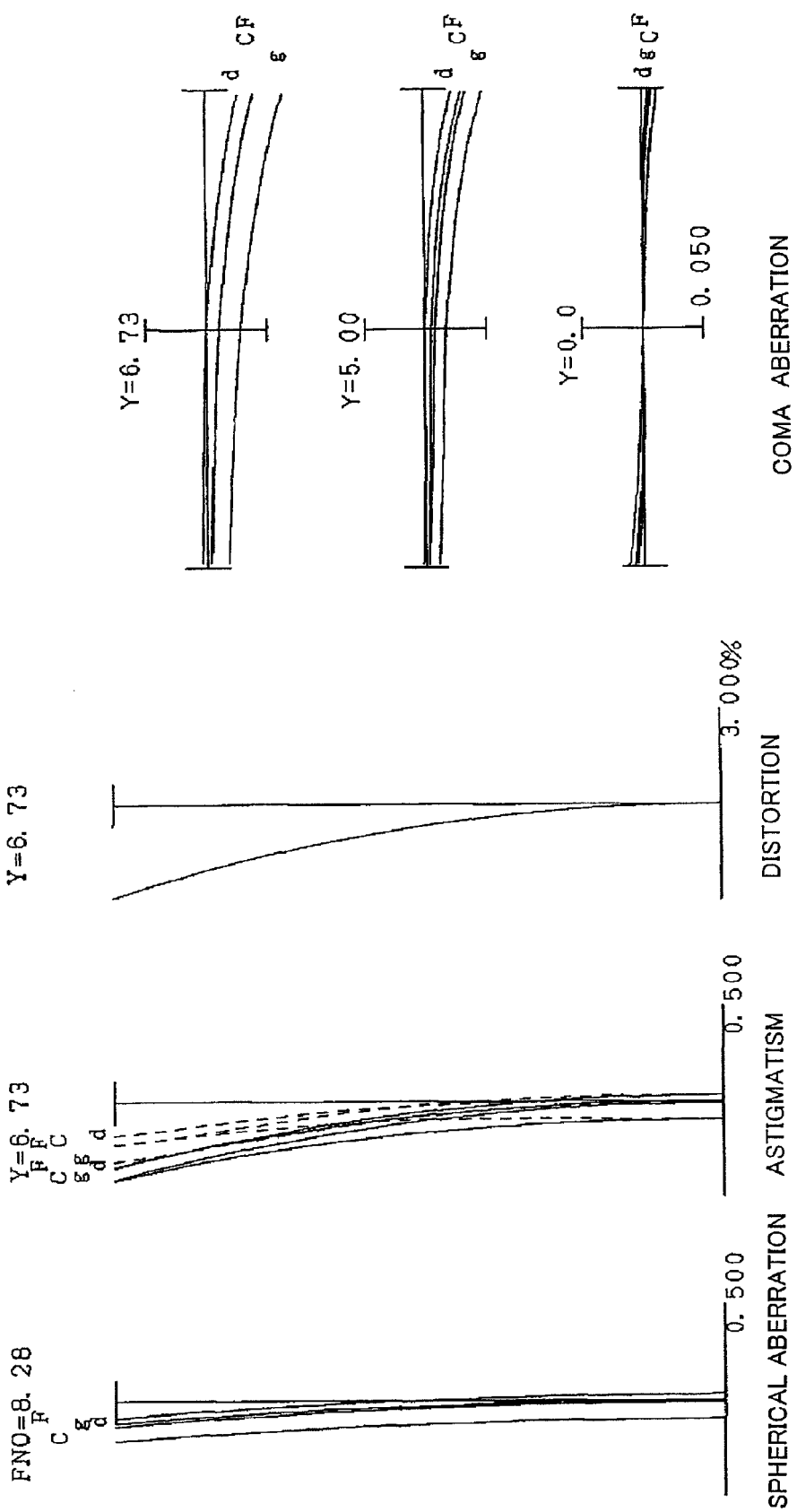
FIG. 6 is aberration diagrams according to the second example.

FIG. 6 is a view showing the spherical aberration, astigmatism, distortion, and coma aberration of the second example. As is apparent from the aberration diagrams, aberration is satisfactorily corrected in the second example, and excellent image quality is maintained.

Third Example

Figure 7:
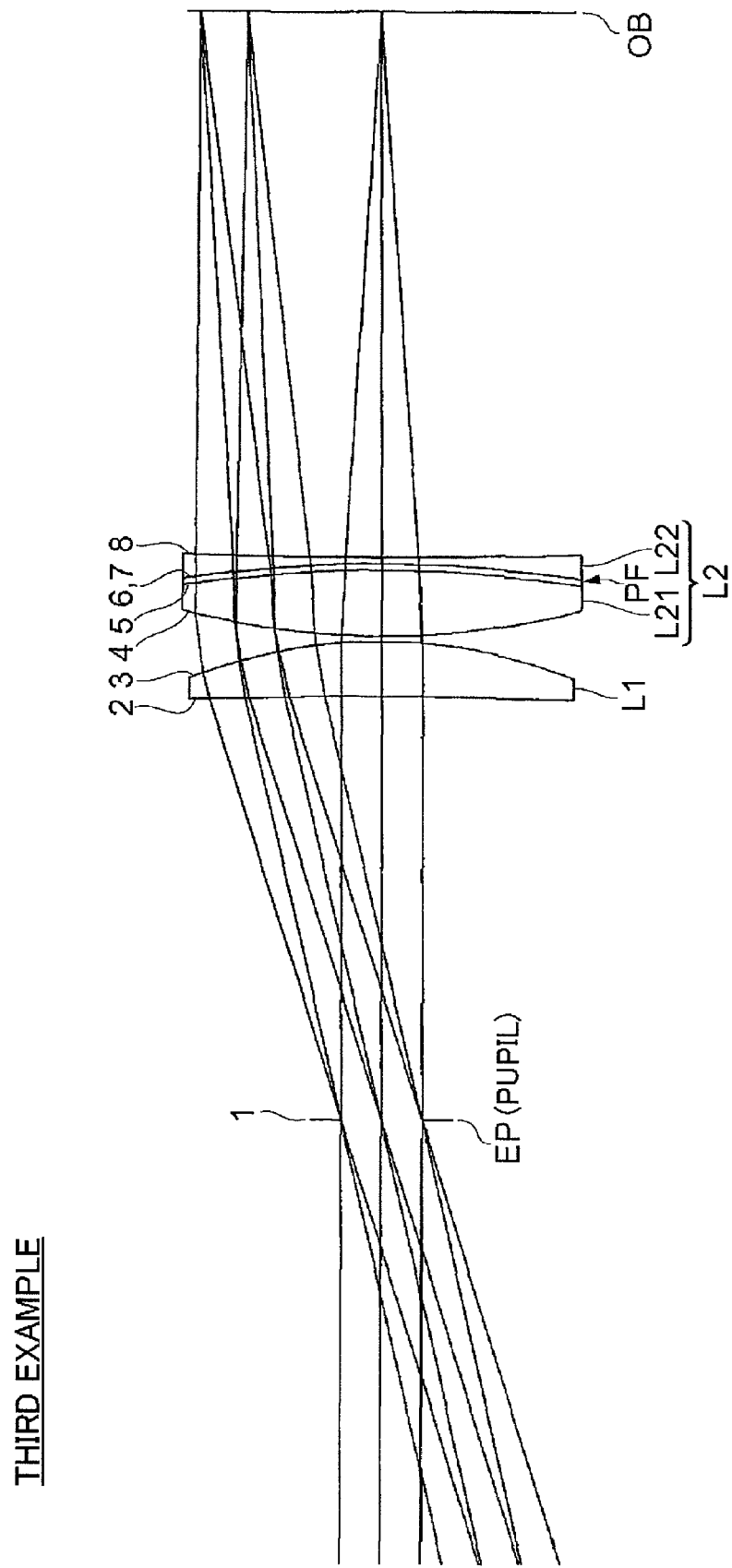
FIG. 7 is a view showing the structure of the optical system according to a third example.

A third example will be described with reference to FIGS. 7 and 8, and Table 3. The eyepiece optical system of the third example as shown in FIG. 7 comprises, in order from the eye point EP (facing a viewing eye), a positive meniscus lens (first convex lens component) L1, the object-facing lens surface of which has an aspheric shape and the concave surface of which faces the eye point EP; and a cemented lens L2 having a biconvex lens L21 (second convex lens component) and a biconcave lens L22 (concave lens component) in which an optical member is provided via a diffractive optical surface to the lens surface facing the eye point EP. Specifically, in the third example, a bonded multi-layer diffractive optical element PF is formed by the biconcave lens L22 and the optical member that is adjacent to the biconcave lens L22. The total angle of field of this eyepiece optical system is 34.6 degrees.

Table 3 shows data for the third example. The surface numbers 1 through 8 in Table 3 correspond to the surface numbers 1 through 8 in FIG. 7. In Table 3, the lens surface corresponding to surface number 3 is an aspheric surface, and the refractive index data of surface number 6 and aspheric surface data of surface number 7 express the optical characteristics of the diffractive optical surface of the bonded multi-layer diffractive optical element PF.

TABLE 3

[Lens data]

| Surface Number | r | d | nd | ng | nC | nF |
|---|---|---|---|---|---|---|
| 1 | 0.00000 | 16.00000 | 1.000000 | | | |
| 2 | -193.80000 | 2.10000 | 1.524700 | 1.536490 | 1.521960 | 1.531290 |
| 3* | -18.73440 | 0.20000 | 1.000000 | | | |
| 4 | 29.07000 | 2.50000 | 1.524700 | 1.536490 | 1.521960 | 1.531290 |
| 5 | -48.30771 | 0.25000 | 1.556900 | 1.570900 | 1.553600 | 1.564700 |
| 6 | -48.30771 | 0.00000 | A | B | C | D |
| 7* | -48.30771 | 0.25000 | 1.518900 | 1.538000 | 1.514400 | 1.528900 |
| 8 | 290.70000 | 20.52985 | 1.000000 | | | |

A = 0.10010000E-05,
B = 0.741868530E-04,
C = 0.111704255E-05,
D = 0.827473110E-04

[Aspheric surface data]

Third surface:

$\kappa = 0.5000$  C2 = 0.00000E-00  C4 = -1.13540E-05,
          C6 = 7.78480E-08  C8 = -3.20250E-10  C10 = 0.00000E-00

Seventh surface:

$\kappa = 1.0000$  C2 = -1.39320E-07  C4 = 3.40630E-10
          C6 = -3.89240E-12  C8 = 1.06750E-14  C10 = 0.00000E-00

[Conditional expression values]

t = 0.25
f = 22.487
$\Delta$Nd = 0.038
fN = -79.810
s = 5.3
L = 41.830
$\Delta$ = 0.0777
Eg = 0.944
EC = 0.965
Ed = 1.000
dN = 0.25
h = 15.000
d = 0.25
$\Delta$vd = 14.38
$\Delta$Nd = 0.038
Eg + Ed + EC = 2.909
  (1) t/f = 0.01112

TABLE 3-continued (2) ΔNd = 0.038
(3) fN/f = −3.549
(4) (t · s)/L² = 0.00076
(5) Δ/f = 0.00346
(6) (Eg + EC)/(2 × Ed) = 0.955
(7) (t + dN)/s = 0.0943
(8) h/d = 60.000
(9) Δvd/ΔNd = 378.42
(10) (Eg + Ed + EC) · f/Δ = 841.88

As is apparent from the data shown in Table 3, all of the conditional expressions (1) through (10) are satisfied by the diffractive optical system of the present example.

Figure 8:
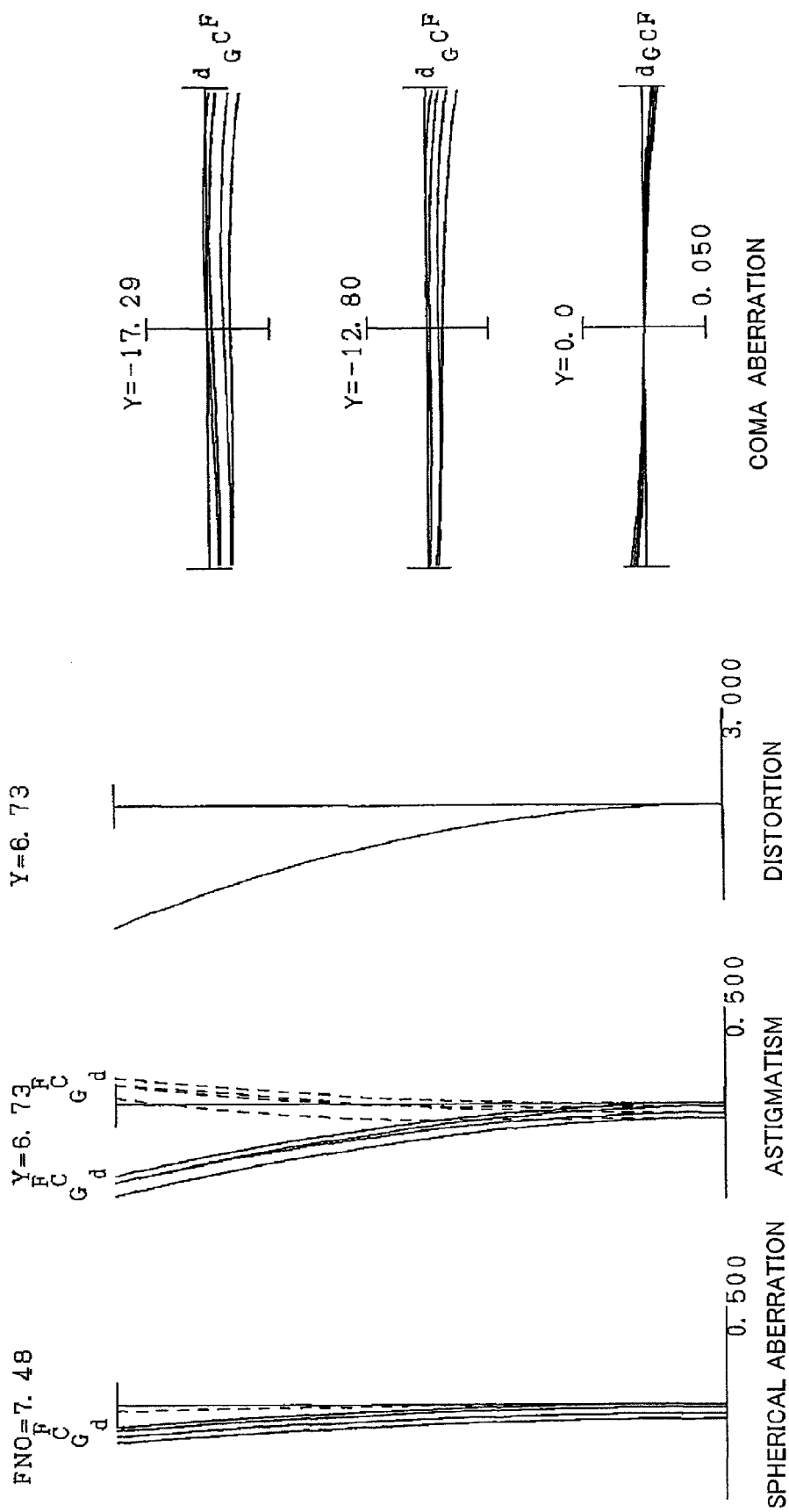
FIG. 8 is aberration diagrams according to the third example.

FIG. 8 is a view showing the spherical aberration, astigmatism, distortion, and coma aberration of the third example. As is apparent from the aberration diagrams, aberration is satisfactorily corrected in the second example, and excellent image quality is maintained.

Fourth Example

Figure 9:
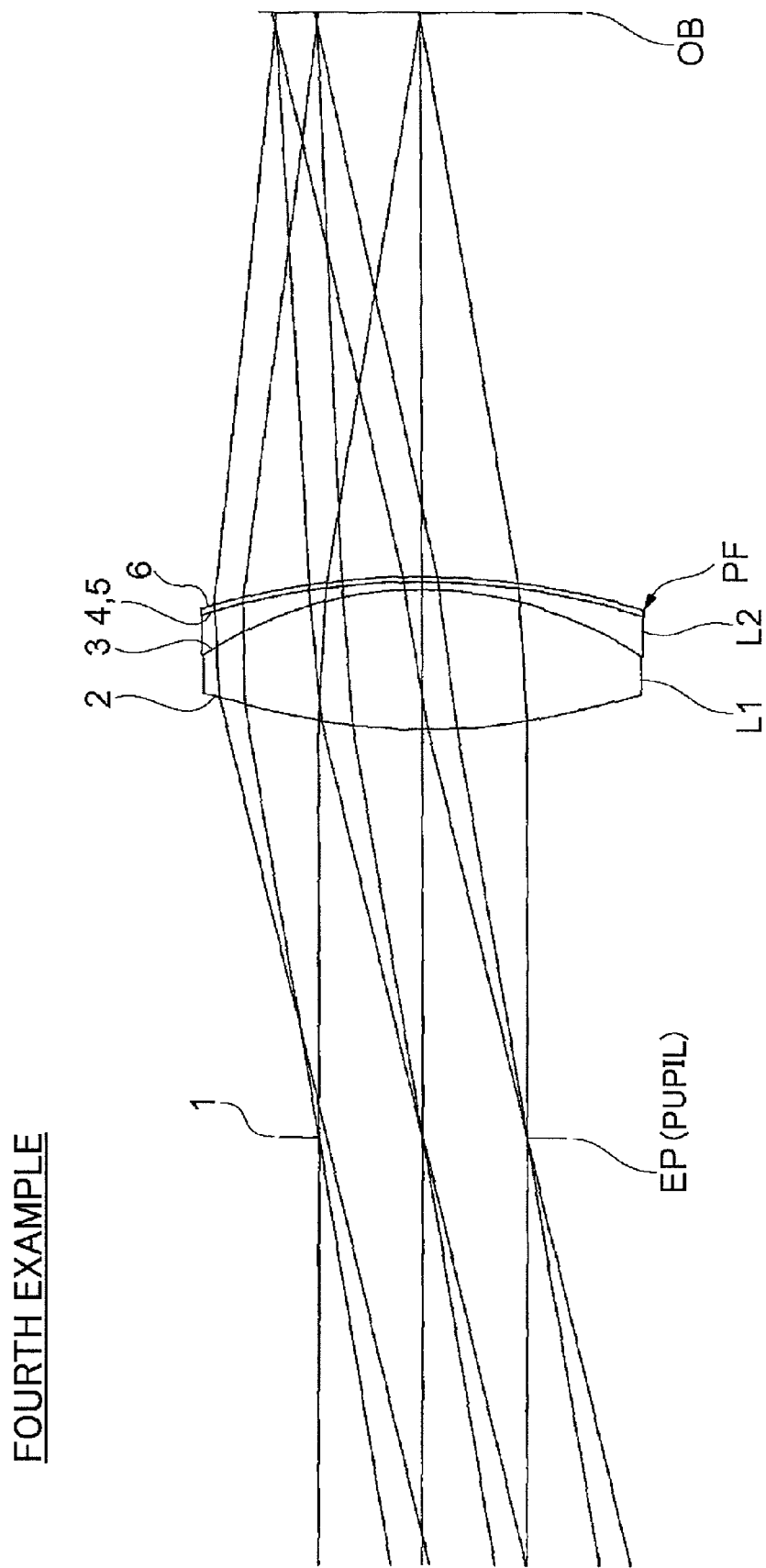
FIG. 9 is a view showing the structure of the optical system according to a fourth example.

A fourth example will be described with reference to FIGS. 9 and 10, and Table 4. The eyepiece optical system of the fourth example as shown in FIG. 9 comprises, in order from the eye point EP (facing a viewing eye), a cemented lens having a biconvex lens (convex lens component) L1 and a negative meniscus lens L2 (concave lens component) in which an optical member is provided via a diffractive optical surface to the lens surface facing the viewing object OB, the concave surface of the negative meniscus lens L2 facing an eye point EP in the optical path between the eye point EP and a viewing object OB such as with an intermediate image formed via an objective system. Specifically, in the fourth example, a bonded multi-layer diffractive optical element PF is formed by the negative meniscus lens L2 and the optical member that is provided to the negative meniscus lens L2. The total angle of field of this eyepiece optical system is 26.7 degrees. The lens surface of the biconvex lens L1 facing the eye point EP, and the lens surface of the optical member facing the viewing object OB are both aspheric surfaces (which correspond to surface numbers 2 and 6 in Table 4 below).

Table 4 shows data for the fourth example. The surface numbers 1 through 6 in Table 4 correspond to the surface numbers 1 through 6 in FIG. 9. In Table 4, the refractive index data and aspheric surface data of surface number 4 express the optical characteristics of the diffractive optical surface of the bonded multi-layer diffractive optical element PF.

TABLE 4

[Lens data]

| Surface Number | r | d | nd | ng | nC | nF |
|---|---|---|---|---|---|---|
| 1 | 0.00000 | 16.00000 | 1.000000 | | | |
| 2* | 24.00000 | 5.50000 | 1.524700 | 1.536490 | 1.521960 | 1.531290 |
| 3 | −15.00000 | 0.30000 | 1.518900 | 1.538000 | 1.514400 | 1.528900 |
| 4* | −28.00000 | 0.00000 | A | B | C | D |
| 5 | −28.00000 | 0.20000 | 1.556900 | 1.570900 | 1.553600 | 1.564700 |
| 6* | −28.00000 | 22.09906 | 1.000000 | | | |

A = 0.10010000E−05,
B = 0.741868530E−04,
C = 0.111704255E−05,
D = 0.827473110E−04

[Aspheric surface data]

Second surface:

κ = −1.5000   C2 = 0.00000E−00   C4 = 6.32910E−05,
             C6 = −2.01180E−06   C8 = 2.66680E−08   C10 = −1.70000E−10

Fourth surface:

κ = 1.0000   C2 = 1.20000E−07   C4 = −1.96830E−09
            C6 = 7.05190E−11   C8 = −9.50000E−13   C10 = 5.40510E−15

Sixth surface:

κ = −9.3788   C2 = 0.00000E−00   C4 = −1.03200E−05
             C6 = −8.32630E−07   C8 = 1.07660E−08   C10 = −6.20740E−11

[Conditional expression values]

t = 0.30
f = 24.184
ΔNd = 0.038
fN = −73.974
s = 6.0
L = 44.099
Δ = 0.0657
Eg = 0.944
EC = 0.965

TABLE 4-continued

Ed = 1.000
dN = 0.30
h = 15.000
d = 0.20
Δvd = 14.38
ΔNd = 0.038
Eg + Ed + EC = 2.909
(1) t/f = 0.0124
(2) ΔNd = 0.0380
(3) fN/f = −3.0588
(4) (t · s)/L$^2$ = 0.000926
(5) Δ/f = 0.002717
(6) (Eg + EC)/(2 × Ed) = 0.95450
(7) (t + dN)/s = 0.10000
(8) h/d = 75.000
(9) Δvd/ΔNd = 378.42
(10) (Eg + Ed + EC) · f/Δ = 1070.795373

As is apparent from the data shown in Table 4, all of the conditional expressions (1) through (10) are satisfied by the diffractive optical system of the present example.

Figure 10:
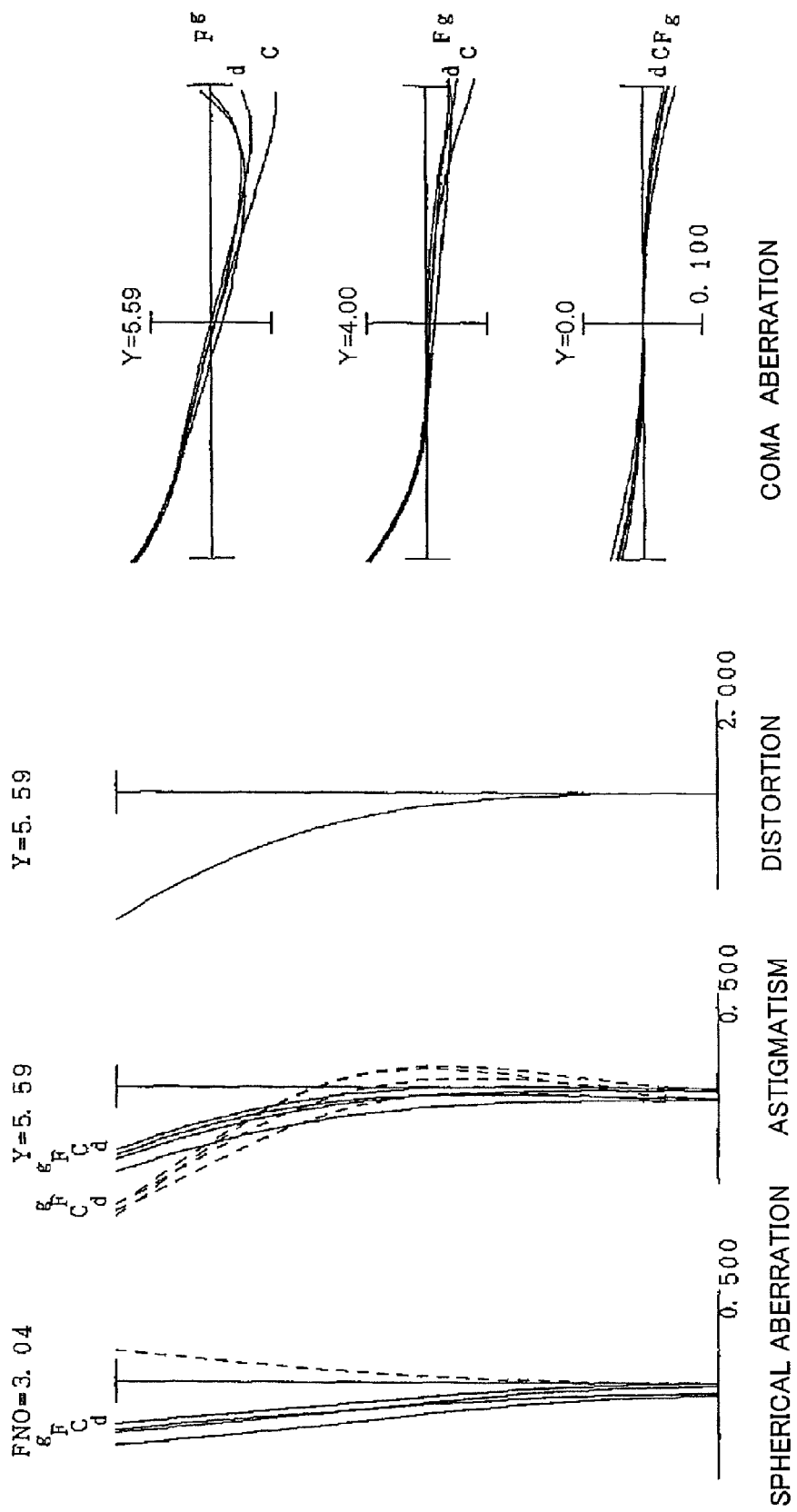
FIG. 10 is aberration diagrams according to the fourth example.

FIG. 10 is a view showing the spherical aberration, astigmatism, distortion, and coma aberration of the fourth example. As is apparent from the aberration diagrams, aberration is satisfactorily corrected in the fourth example, and excellent image quality is maintained.

Fifth Example

Figure 11:
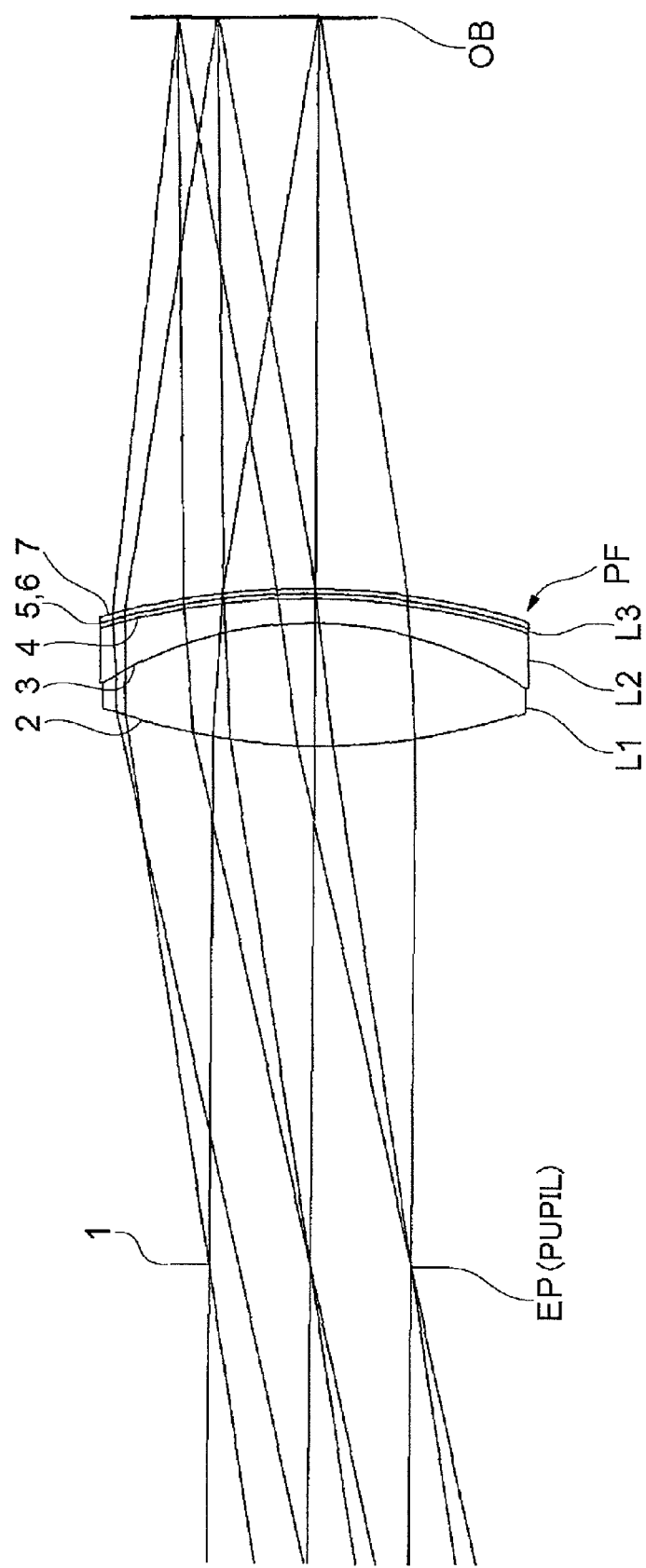
FIG. 11 is a view showing the structure of the optical system according to a fifth example.

A fifth example will be described with reference to FIGS. 11 and 12, and Table 5. The eyepiece optical system of the fifth example as shown in FIG. 11 comprises, in order from an eye point EP (facing a viewing eye), a cemented lens having a biconvex lens (convex lens component) L1, a negative meniscus lens L2 (first concave lens component), the concave surface of which faces the eye point EP, and a negative meniscus lens L3 (second concave lens component) in which an optical member is provided via a diffractive optical surface to the lens surface facing a viewing object OB, and the concave surface of the negative meniscus lens L3 faces the eye point EP in the optical path between the eye point EP and the viewing object OB such as with an intermediate image formed via an objective system. Specifically, in the fifth example, a bonded multi-layer diffractive optical element PF is formed by the negative meniscus lens L3 and the optical member that is provided to the negative meniscus lens L3. The total angle of field of this eyepiece optical system is 15.2 degrees. The lens surface of the biconvex lens L1 facing the eye point EP, and the lens surface of the optical member facing the viewing object OB are both aspheric surfaces (which correspond to surface numbers 2 and 7 in Table 5 below).

Table 5 shows data for the fifth example. The surface numbers 1 through 7 in Table 5 correspond to the surface numbers 1 through 7 in FIG. 11. In Table 5, the refractive index data and aspheric surface data of surface number 5 express the optical characteristics of the diffractive optical surface of the bonded multi-layer diffractive optical element PF.

TABLE 5

[Lens data]

| Surface Number | r | d | nd | ng | nC | nF |
|---|---|---|---|---|---|---|
| 1 | 0.00000 | 21.00000 | 1.000000 | | | |
| 2* | 24.00000 | 5.00000 | 1.524700 | 1.536490 | 1.521960 | 1.531290 |
| 3 | −15.00000 | 1.00000 | 1.582760 | 1.607990 | 1.577240 | 1.596450 |
| 4 | −28.00000 | 0.20000 | 1.518900 | 1.538000 | 1.514400 | 1.528900 |
| 5* | −28.00000 | 0.00000 | A | B | C | D |
| 6 | −28.00000 | 0.20000 | 1.556900 | 1.570900 | 1.553600 | 1.564700 |
| 7* | −28.00000 | 23.43431 | 1.000000 | | | |

A = 0.10010000E−05,
B = 0.741868530E−04,
C = 0.111704255E−05,
D = 0.827473110E−04

[Aspheric surface data]

Second surface:

κ = −1.2000    C2 = 0.00000E−00    C4 = 6.32910E−05,
              C6 = −2.01180E−06    C8 = 2.66680E−08    C10 = −1.50000E−10

Fifth surface:

κ = 1.0000    C2 = 9.00000E−08    C4 = −1.96830E−09
              C6 = 7.05190E−11    C8 = −1.00000E−12    C10 = 5.40510E−15

Seventh surface:

κ = −9.3788   C2 = 0.00000E−00    C4 = −1.03200E−05
              C6 = −8.32630E−07    C8 = 1.07660E−08    C10 = −6.20740E−11

TABLE 5-continued

[Conditional expression values]

t = 0.20
f = 25.712
ΔNd = 0.038
fN = −49.392
s = 6.4
L = 50.834
Δ = 0.0437
Eg = 0.944
EC = 0.965
Ed = 1.000
dN = 0.30
h = 15.000
d = 0.20
Δvd = 14.38
ΔNd = 0.038
Eg + Ed + EC = 2.909
  (1) t/f = 0.0078
  (2) ΔNd = 0.0380
  (3) fN/f = −1.921
  (4) (t · s)/$L^2$ = 0.000495
  (5) Δ/f = 0.001700
  (6) (Eg + EC)/(2 × Ed) = 0.95450
  (7) (t + dN)/s = 0.07813
  (8) h/d = 75.000
  (9) Δvd/ΔNd = 378.42
  (10) (Eg + Ed + EC) · f/Δ = 1711.583707

As is apparent from the data shown in Table 5, all of the conditional expressions (1) through (10) are satisfied by the diffractive optical system of the present example.

Figure 12:
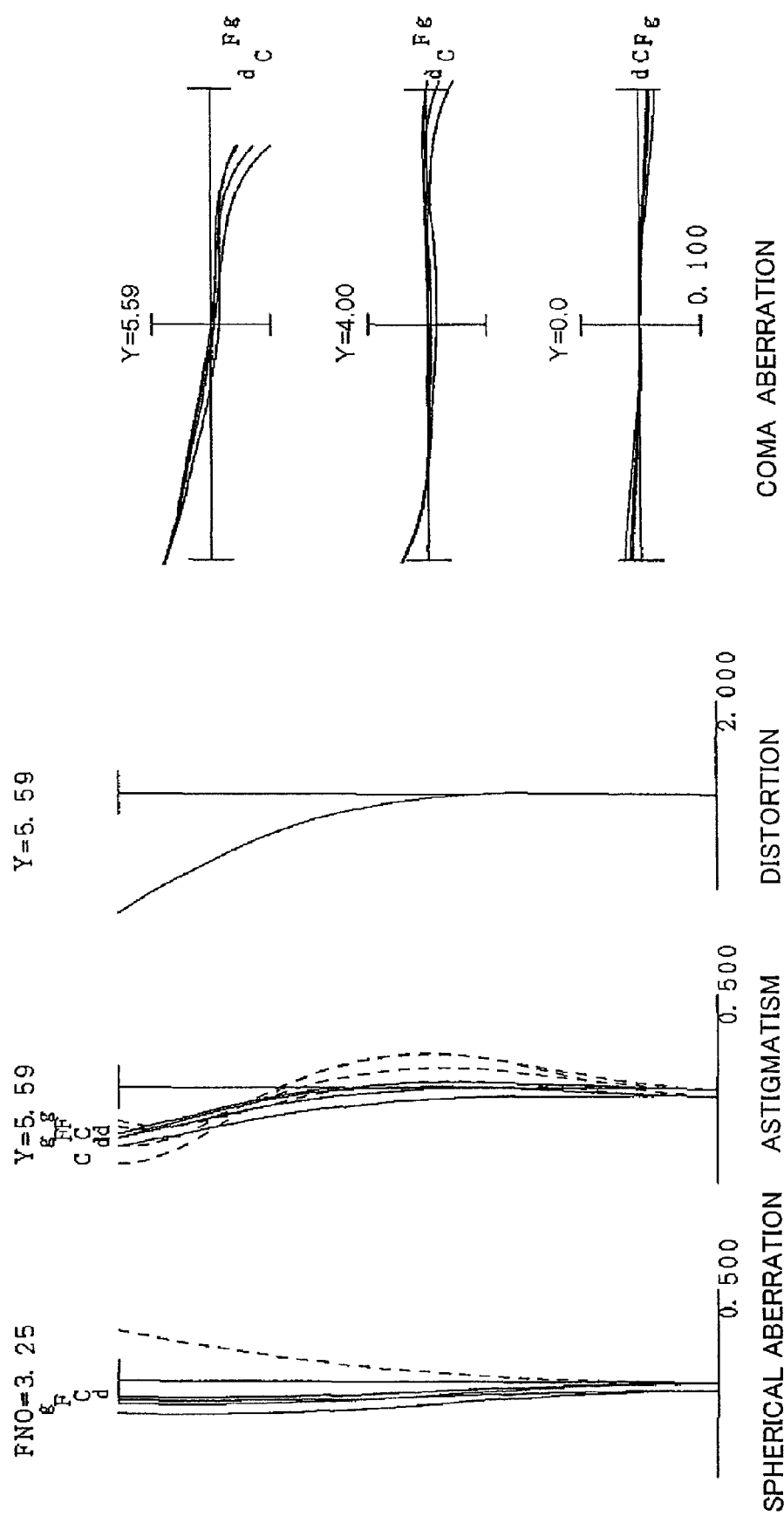
FIG. 12 is aberration diagrams according to the fifth example.

FIG. 12 is a view showing the spherical aberration, astigmatism, distortion, and coma aberration of the fifth example. As is apparent from the aberration diagrams, aberration is satisfactorily corrected in the fifth example, and excellent image quality is maintained.

Sixth Example

Figure 13:
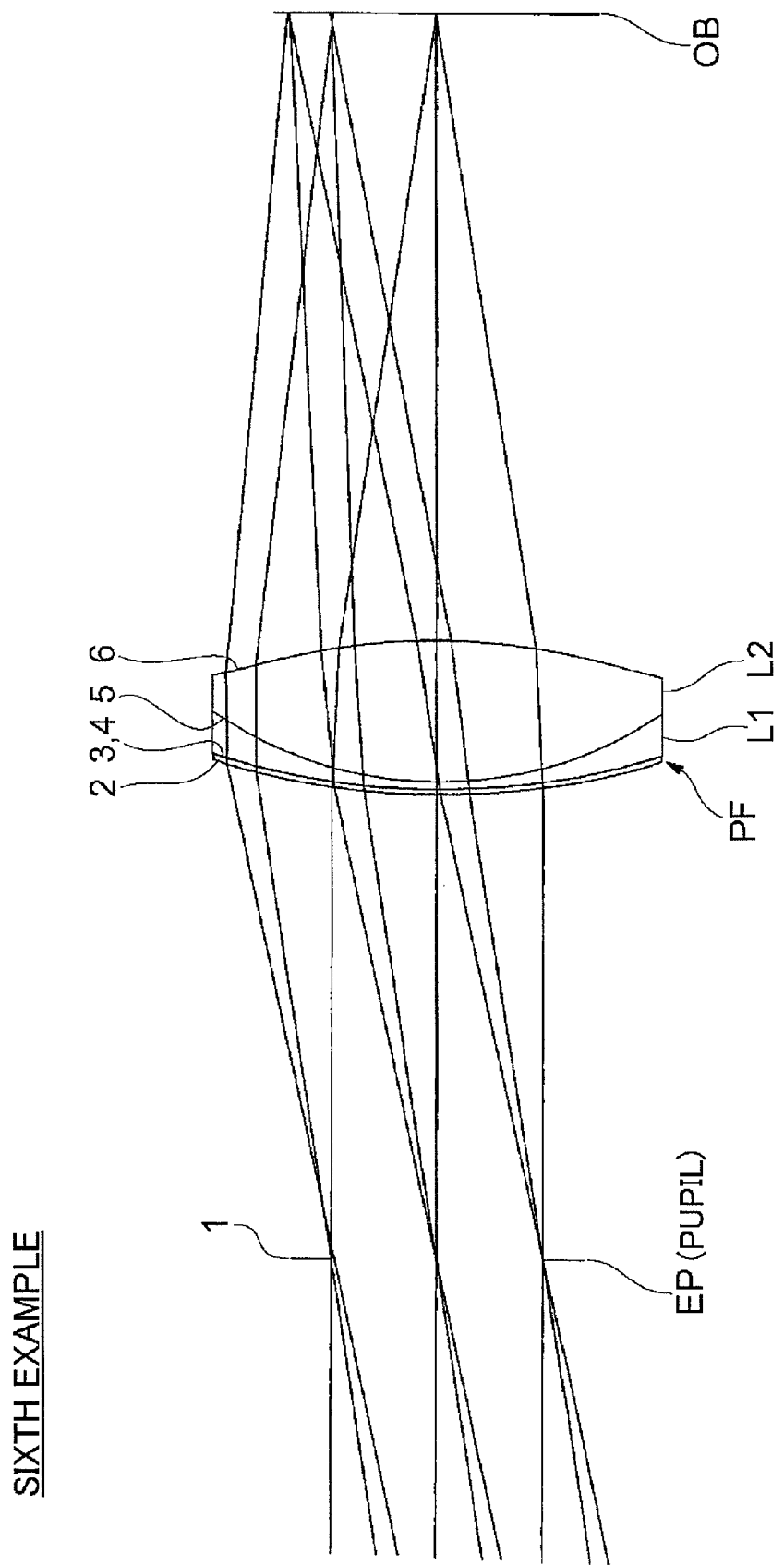
FIG. 13 is a view showing the structure of the optical system according to a sixth example.

A sixth example will be described with reference to FIGS. 13 and 14, and Table 6. The eyepiece optical system of the sixth example as shown in FIG. 13 comprises, in order from an eye point EP (facing a viewing eye), a cemented lens having a biconvex lens (convex lens component) L2, and a negative meniscus lens L1 (concave lens component) in which an optical member is provided via a diffractive optical surface to the lens surface facing the eye point EP, and the convex surface of the negative meniscus lens L1 faces the eye point EP in the optical path between the eye point EP and a viewing object OB such as an intermediate image formed via an objective system. Specifically, in the sixth example, a bonded multi-layer diffractive optical element PF is formed by the negative meniscus lens L1 and the optical member that is provided to the negative meniscus lens L1. The total angle of field of this eyepiece optical system is 24.2 degrees. The lens surface of the optical member facing the eye point EP, and the lens surface of the biconvex lens L2 facing the viewing object OB are both aspheric surfaces (which correspond to surface numbers 2 and 6 in Table 6 below).

Table 6 shows data for the sixth example. The surface numbers 1 through 6 in Table 6 correspond to the surface numbers 1 through 6 in FIG. 13. In Table 6, the refractive index data of surface number 3 and the aspheric surface data of surface number 4 express the optical characteristics of the diffractive optical surface of the bonded multi-layer diffractive optical element PF.

TABLE 6

[Lens data]

| Surface Number | r | d | nd | ng | nC | nF |
|---|---|---|---|---|---|---|
| 1 | 0.00000 | 21.00000 | 1.000000 | | | |
| 2* | 28.00000 | 0.20000 | 1.556900 | 1.570900 | 1.553600 | 1.564700 |
| 3 | 28.00000 | 0.00000 | A | B | C | D |
| 4* | 28.00000 | 0.30000 | 1.518900 | 1.538000 | 1.514400 | 1.528900 |
| 5 | 15.00000 | 5.50000 | 1.490800 | 1.501600 | 1.488300 | 1.496900 |
| 6* | −28.00000 | 24.32488 | 1.000000 | | | |

A = 0.10010000E−05,
B = 0.741868530E−04,
C = 0.111704255E−05,
D = 0.827473110E−04

[Aspheric surface data]

Second surface:

κ = −9.3788    C2 = 0.00000E−00    C4 = 1.00000E−05,
              C6 = 8.50000E−07    C8 = −1.07660E−08    C10 = 7.00000E−11

TABLE 6-continued

Fourth surface:

$\kappa = 1.0000$  $C2 = -1.20000E-07$  $C4 = -1.96830E-09$
                   $C6 = -7.05190E-11$  $C8 = 9.50000E-13$   $C10 = -5.40510E-15$ Sixth surface:

$\kappa = -1.5000$  $C2 = 0.00000E-00$  $C4 = -5.50000E-05$
                    $C6 = 1.50000E-06$  $C8 = -2.00000E-08$  $C10 = 1.60000E-10$

[Conditional expression values]

$t = 0.30$
$f = 26.355$
$\Delta Nd = 0.038$
$fN = -73.974$
$s = 6.0$
$L = 48.325$
$\Delta = 0.189$
$Eg = 0.944$
$EC = 0.965$
$Ed = 1.000$
$dN = 0.30$
$h = 15.000$
$d = 0.20$
$\Delta \nu d = 14.38$
$\Delta Nd = 0.038$
$Eg + Ed + EC = 2.909$
(1) $t/f = 0.0114$
(2) $\Delta Nd = 0.0380$
(3) $fN/f = -2.8068$
(4) $(t \cdot s)/L^2 = 0.000771$
(5) $\Delta/f = 0.007171$
(6) $(Eg + EC)/(2 \times Ed) = 0.95450$
(7) $(t + dN)/s = 0.10000$
(8) $h/d = 75.000$
(9) $\Delta \nu d/\Delta Nd = 378.42$
(10) $(Eg + Ed + EC) \cdot f/\Delta = 405.6438889$ As is apparent from the data shown in Table 6, all of the conditional expressions (1) through (10) are satisfied by the diffractive optical system of the present example.

Figure 14:
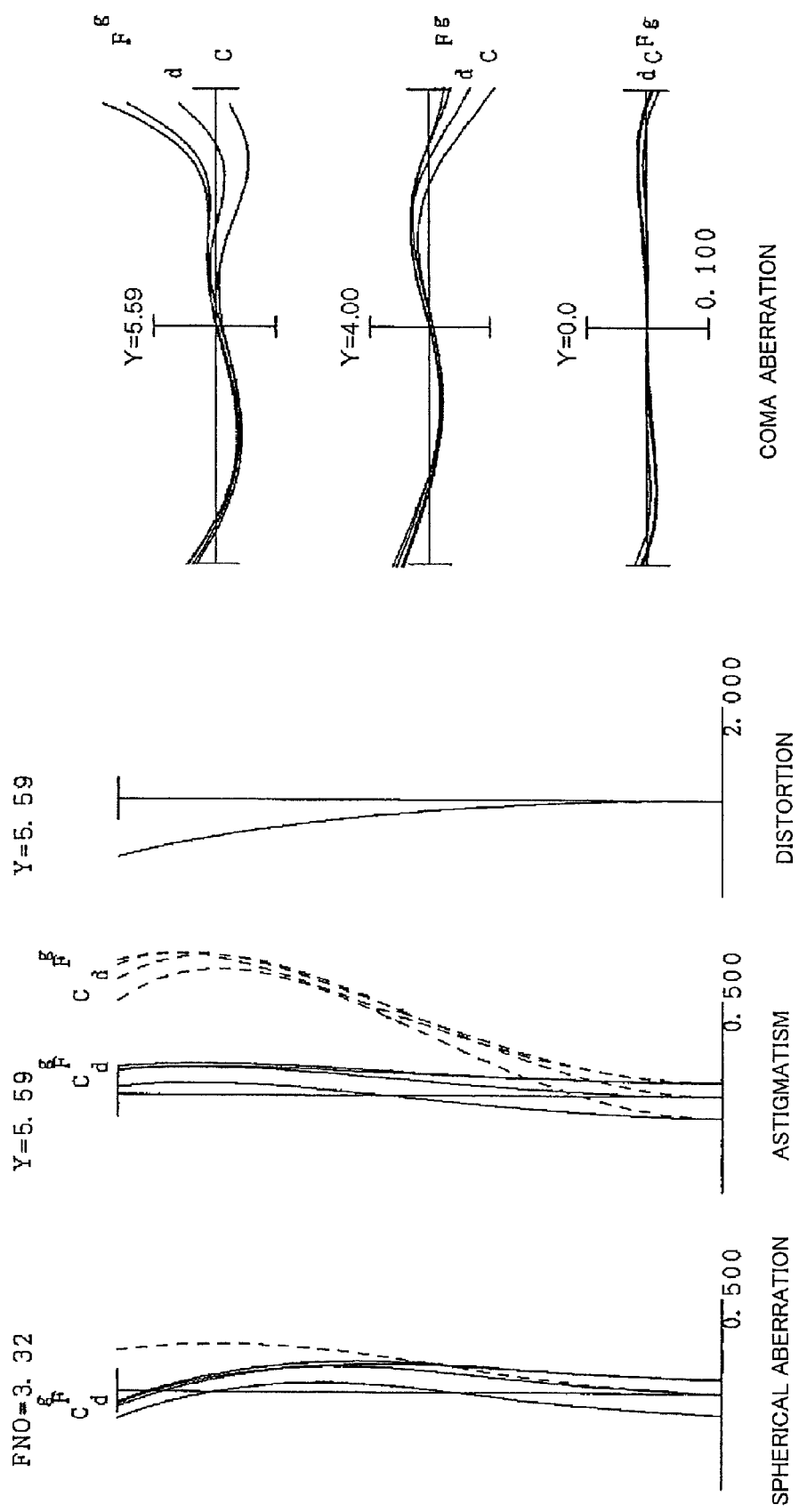
FIG. 14 is aberration diagrams according to the sixth example.

FIG. 14 is a view showing the spherical aberration, astigmatism, distortion, and coma aberration of the sixth example. As is apparent from the aberration diagrams, aberration is satisfactorily corrected in the sixth example, and excellent image quality is maintained.

For comparison, Table 7 shows the extent to which chromatic aberration (longitudinal chromatic aberration and lateral chromatic aberration) occurs when there is no diffractive optical element PF in the lens system, compared with cases in which a diffractive optical element PF is present in the lens system in the examples described above.

TABLE 7

|  | Longitudinal chromatic aberration | Lateral chromatic aberration |
| --- | --- | --- |
| First Example | 6.6x | 5.1x |
| Second Example | 5.3x | 4.5x |
| Third Example | 5.5x | 6.1x |
| Fourth Example | 10.9x | 3.8x |
| Fifth Example | 6.2x | 4.1x |
| Sixth Example | 2.5x | 7.5x |

It is apparent from Table 7 that when there is no diffractive optical element in the lens system in the examples described above, longitudinal chromatic aberration and lateral chromatic aberration are both more severe than in cases in which a diffractive optical element PF is present in the lens system. In other words, it is apparent that in the examples described above, since a (bonded multi-layer) diffractive optical element PF for satisfying the desired conditions is incorporated into the eyepiece optical system, chromatic aberration is satisfactorily corrected throughout a wide wavelength range by the effects of the multi-layer diffractive optical element PF. It is also apparent that a small-sized, lightweight, thin-profile eyepiece optical system having excellent optical performance is realized in each of the examples.

A bonded multi-layer diffractive optical element PF is incorporated into the eyepiece optical system in each of the examples described above, but this configuration is not limiting, and the same effects can be obtained by incorporating a separated multi-layer diffractive optical element.

The present invention is also applied to an eyepiece optical system in the examples described above, but this configuration is not limiting, and the present invention may also be applied to a viewing optical system other than an eyepiece optical system, to a projection optical system for projecting on a screen an image of a display element that is in the position of the viewing object of the examples, or to a common diffractive optical system provided with a concave lens.

Figure 15:
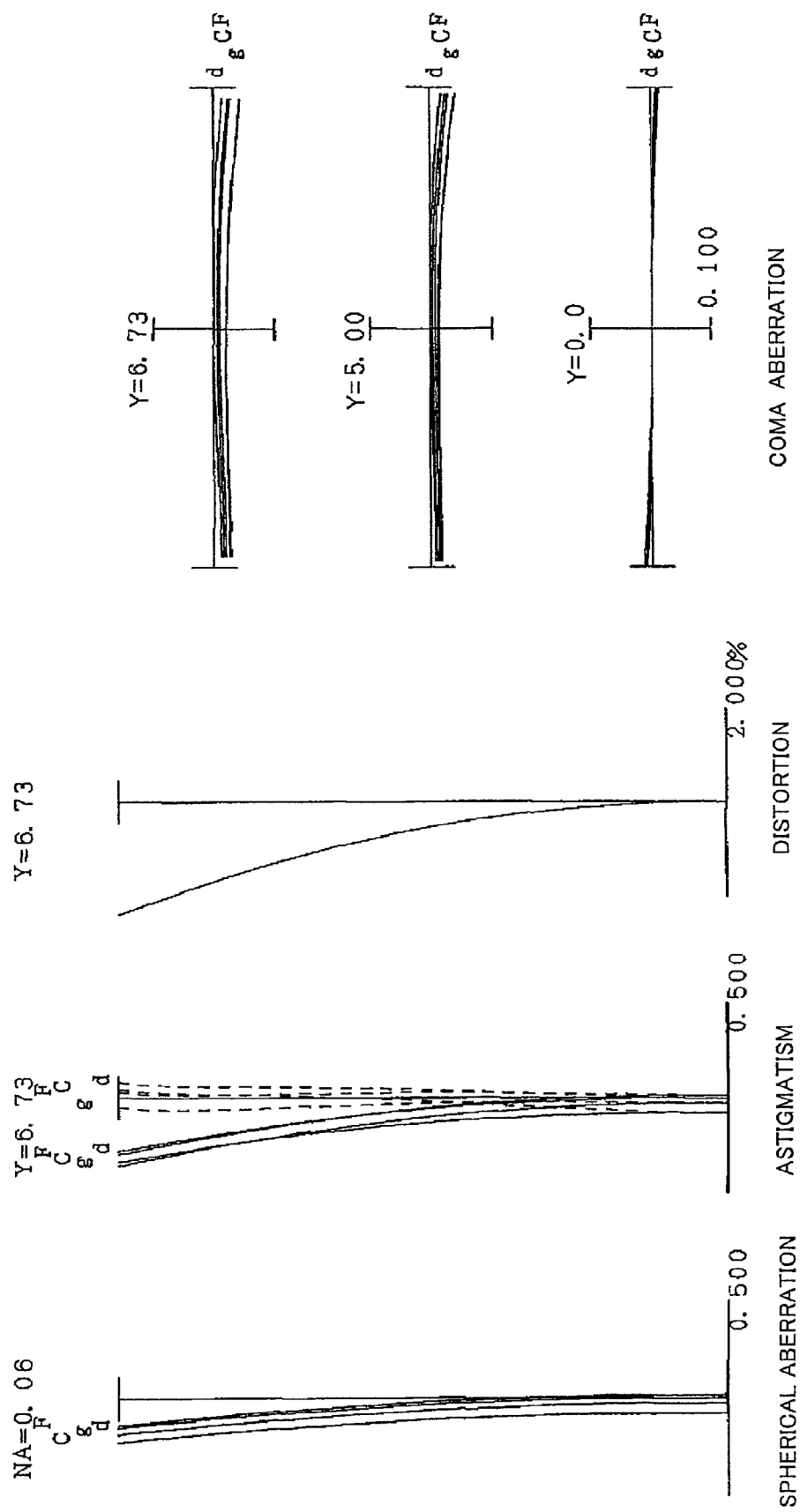
FIG. 15 is aberration diagrams showing a case in which the optical system of the first example is applied to a projection optical system.

A case in which the diffractive optical system of the first example described above (see FIG. 2) is applied to a projection optical system will be described. Using the optical system of the first example in which the positive meniscus lens L1 is led 0.565 mm toward the eye point EP, for example, the image of a display element (e.g., liquid crystal display device or the like) in the position of the viewing object OB is projected onto a screen placed 1 m in front of the eye point EP, whereby a magnified view of the image of the display element can be produced. The projection magnification in this case is 41.97, and the image of the display element is projected onto the screen and enlarged to a diagonal length of 578 mm (approximately 23 inches). FIG. 15 shows the spherical aberration, astigmatism, distortion, and coma aberration of the projection optical system to which the first example is applied. As is apparent from the aberration diagrams, aberration is satisfactorily corrected in the projection optical system, and excellent image quality is maintained.

An optical device in which the diffractive optical system of the embodiment described above is used will next be briefly described.

Figure 16:
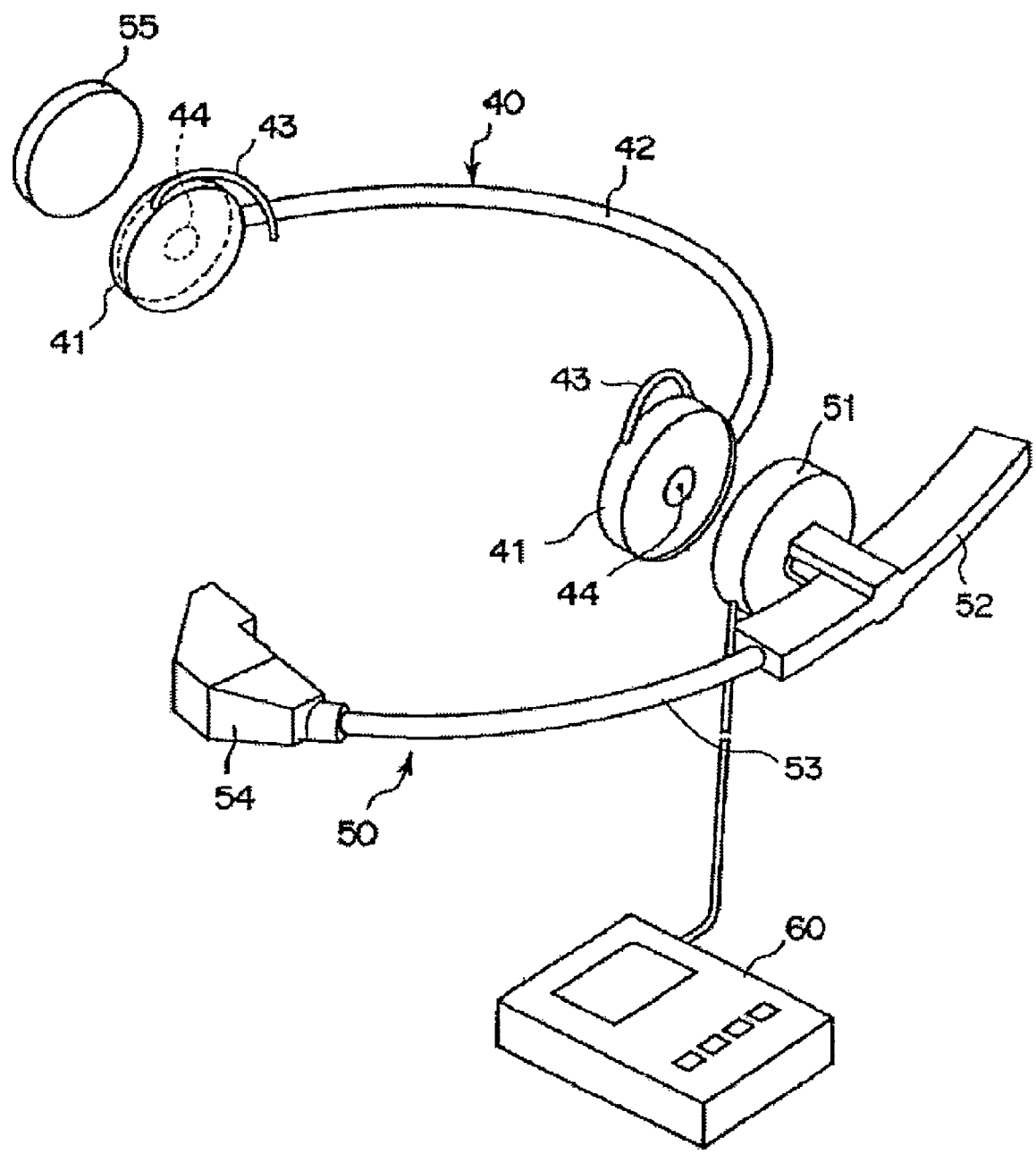
FIG. 16 is a view showing the basic structure of a head-mounted display in which the diffractive optical system is used.

FIG. 16 is a view showing the basic structure of a head-mounted display in which the diffractive optical system of the embodiment described above is used. A head-mounted display is a system for providing a projected image and sound to a user, and is worn on the head of the user. The head-mounted display comprises a headphone-type head mount 40; a display unit 50 that can be attached to the head mount 40; and a playback device 60 for feeding a sound signal or image signal to the display unit 50 and feeding electrical power to each member.

The head mount 40 is composed of a pair of speaker units 41 positioned in the vicinity of the left and right ears of the user when the head mount 40 is worn by the user; an arm portion 42 for supplying an urging force to hold onto the user's head via the speaker units 41; and ear hook members 43 for hanging onto the user's ears, the ear hook members 43 extending in an arching shape from each of the pair of speaker units 41. Each of the speaker units 41 is shaped so as to be able to fit with a connecting portion 51 of the display unit 50, and electrical junctions 44 of the display unit 50 are provided on the outer sides of the speaker units 41. When the display unit 50 is not attached to the speaker units 41, the appearance thereof is maintained by attaching dummy caps 55.

The display unit 50 comprises the connecting portion 51 capable of fitting on the outside of the speaker units 41; a housing 52 provided with a space for accommodating a display arm 53 described hereinafter, the housing 52 being attached to the connecting portion 51; and a display arm 53 that can be housed in and extended from the housing 52, a display unit 54 in which a liquid crystal display element, the diffractive optical system of the abovementioned embodiment, or the like is incorporated being attached at the distal end of the display arm 53. The display unit 50 is connected to the playback device 60, electrical power fed from the playback device 60 and a picture signal are fed to the display unit 54, and wiring is also included to feed the sound signal to the connecting portion 51.

The connecting portion 51 has an electrical junction (not shown) capable of connecting to the electrical junctions 44 of the speaker units 41, and the sound signal is fed to the speaker units 41 via the electrical junction (not shown).

The display arm 53 can be accommodated in the housing 52, as described above, and when the head-mounted display is worn, the display arm 53 is deployed from the housing 52 so that the display unit 54 is positioned in front of the eye of the user. When the head-mounted display is not being used, the display arm 53 can be stored inside the housing 52.

AS shown in FIG. 16, the display unit 54 is supported by a cantilever structure formed by the display arm 53. The display unit 54 must therefore be small-sized and lightweight. The optical system provided in the display unit 54 comprises a liquid crystal display element; a diffractive optical system for forming a virtual image of the projected image of the liquid crystal display element; a backlight for illuminating the liquid crystal display element; and an illumination optical system for collecting and diffusing the light of the backlight. In the illumination optical system, the backlight side acts as a lens surface for collecting the light of the backlight, and the liquid crystal display element side acts as a ground-glass or micro-lens array diffusing surface, and through this configuration, the illumination distribution of the liquid crystal display element is made uniform. The lens surface may also have a Fresnel lens shape.

The diffractive optical system in this case is the diffractive optical system described in the present embodiment above, and has both collecting effects and diffractive effects due to refractive effects, and chromatic aberration caused by refractive effects is cancelled out by the diffractive effects. Consequently, a high-quality projected image can be provided to the user even when a full-color image is projected using the eyepiece of the head-mounted display as described above.

A head-mounted display was described as an example of the optical device in the above embodiment, but the optical device in which the diffractive optical system of the present embodiment is used is not limited to this configuration; the present invention can be applied to various other optical systems and optical devices (e.g., cameras, projectors, and the like) within the intended scope of the present invention to achieve satisfactory optical performance.

Requirements for implementing the embodiment were described above to aid in understanding the present invention, but shall not be construed as limiting the present invention.

What is claimed is:

1. A diffractive optical system including a diffractive optical element, the diffractive optical system being characterized in that:

the diffractive optical element has a concave lens component having a first diffractive optical surface, and an optical member having a second diffractive optical surface;

the concave lens component and the optical member are arranged so that the first diffractive optical surface and the second diffractive optical surface face each other;

the conditional expression $0.003 < t/f < 0.3$ is satisfied, where t is a thickness of the concave lens component on an optical axis of the diffractive optical system, and f is a focal length of the diffractive optical system, and further characterized in that the following conditional expression is satisfied:

$$-8.5 < fN/f < -0.3,$$

where fN is a focal length of the concave lens component and is less than 0.

2. The diffractive optical system according to claim 1, characterized in that the following conditional expression is satisfied:

$$0.005 < \Delta Nd < 0.45,$$

where ΔNd is a difference in refractive index between the concave lens component and the optical member at d-line.

3. The diffractive optical system according to claim 1, characterized in that the following conditional expression is satisfied:

$$0.00015 < (t \cdot s)/L^2 < 0.1,$$

where s is a total thickness of the diffractive optical system on the optical axis, and L is a distance from a pupil to an image surface of the diffractive optical system.

4. The diffractive optical system according to claim 1, characterized in that the following conditional expression is satisfied:

$$(Eg + EC)/(2 \times Ed) > 0.8,$$

where Ed is a diffraction efficiency at d-line, Eg is a diffraction efficiency at g-line, and EC is a diffraction efficiency at C-line.

5. The diffractive optical system according to claim 1, characterized in that the following conditional expression is satisfied:

$$0.03<(t+dN)/s<0.5,$$

where dN is a thickness of the optical member on the optical axis, and s is a total thickness of the diffractive optical system on the optical axis.

6. The diffractive optical system according to claim 1, characterized in that the following conditional expression is satisfied:

$$10<h/d<500,$$

where h is a grating height of the first diffractive optical surface, and d is the lesser of the thickness of the concave lens component on the optical axis and a thickness of the optical member on the optical axis.

7. The diffractive optical system according to claim 1, further comprising:
a first convex lens component, and
a cemented lens formed by a second convex lens component and the concave lens component;
wherein one of the concave lens component and the optical member is formed by a material having a relatively high refractive index and low dispersion, and the other of the concave lens component and the optical member is formed by a material having a relatively low refractive index and high dispersion.

8. The diffractive optical system according to claim 1, characterized in that:
the first diffractive optical surface is disposed on a concave surface facing a pupil; and
step portions of the grating of the first diffractive optical surface are formed at an angle with respect to the optical axis.

9. An optical device comprising the diffractive optical system according to claim 1.

10. A diffractive optical system including a diffractive optical element, the diffractive optical system being characterized in that:
the diffractive optical element has a concave lens component having a first diffractive optical surface, and an optical member having a second diffractive optical surface;
the concave lens component and the optical member are arranged so that the first diffractive optical surface and the second diffractive optical surface face each other;
the conditional expression $0.003<t/f<0.3$ is satisfied, where t is a thickness of the concave lens component on an optical axis of the diffractive optical system, and f is a focal length of the diffractive optical system; and
further characterized in that the following conditional expression is satisfied:

$$0.001<\Delta/f<0.1,$$

where $\Delta$ is a spread width in the optical axis direction of d-line, g-line, C-line, and F-line spectra of the diffractive optical system.

11. The diffractive optical system according to claim 10, characterized in that the following conditional expression is satisfied:

$$0.005<\Delta Nd<0.45,$$

where $\Delta Nd$ is a difference in refractive index between the concave lens component and the optical member at d-line.

12. The diffractive optical system according to claim 10, characterized in that the following conditional expression is satisfied:

$$-8.5<fN/f<-0.3,$$

where fN is a focal length of the concave lens component and is less than 0.

13. The diffractive optical system according to claim 10, characterized in that the following conditional expression is satisfied:

$$0.00015<(t \cdot s)/L^2<0.1,$$

where s is a total thickness of the diffractive optical system on the optical axis, and L is a distance from a pupil to an image surface of the diffractive optical system.

14. The diffractive optical system according to claim 10, characterized in that the following conditional expression is satisfied:

$$(Eg+EC)/(2 \times Ed)>0.8,$$

where Ed is a diffraction efficiency at d-line, Eg is a diffraction efficiency at g-line, and EC is a diffraction efficiency at C-line.

15. The diffractive optical system according to claim 10, characterized in that the following conditional expression is satisfied:

$$0.03<(t+dN)/s<0.5,$$

where dN is a thickness of the optical member on the optical axis, and s is a total thickness of the diffractive optical system on the optical axis.

16. The diffractive optical system according to claim 10, characterized in that the following conditional expression is satisfied:

$$10<h/d<500,$$

where h is a grating height of the first diffractive optical surface, and d is the lesser of the thickness of the concave lens component on the optical axis and a thickness of the optical member on the optical axis.

17. The diffractive optical system according to claim 10, further comprising:
a first convex lens component, and
a cemented lens formed by a second convex lens component and the concave lens component;
wherein one of the concave lens component and the optical member is formed by a material having a relatively high refractive index and low dispersion, and the other of the concave lens component and the optical member is formed by a material having a relatively low refractive index and high dispersion.

18. The diffractive optical system according to claim 10, characterized in that:
the first diffractive optical surface is disposed on a concave surface facing a pupil; and
step portions of the grating of the first diffractive optical surface are formed at an angle with respect to the optical axis.

19. An optical device comprising the diffractive optical system according to claim 10.

* * * * *